US007209916B1

(12) United States Patent
Seshadri et al.

(10) Patent No.: US 7,209,916 B1
(45) Date of Patent: Apr. 24, 2007

(54) EXPRESSION AND FLEXIBILITY FRAMEWORK FOR PROVIDING NOTIFICATION(S)

(75) Inventors: Praveen Seshadri, Bellevue, WA (US); Philip Garrett, Woodinville, WA (US); Holly Knight, Woodinville, WA (US); Robert F. Blanch, Clyde Hill, WA (US); Shyamalan Pather, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 445 days.

(21) Appl. No.: 10/375,250

(22) Filed: Feb. 27, 2003

Related U.S. Application Data

(63) Continuation-in-part of application No. 10/180,360, filed on Jul. 26, 2002.

(51) Int. Cl.
 *G06F 7/00* (2006.01)
 *G06F 9/46* (2006.01)
 *G06F 15/16* (2006.01)
(52) U.S. Cl. .......................... 707/3; 719/318; 709/207
(58) Field of Classification Search .................. 707/3, 707/318; 719/318; 709/207
See application file for complete search history.

(56) References Cited

U.S. PATENT DOCUMENTS

| 4,774,658 | A | | 9/1988 | Lewin |
|---|---|---|---|---|
| 5,367,633 | A | | 11/1994 | Matheny et al. |
| 5,416,725 | A | | 5/1995 | Pacheco et al. |
| 5,555,346 | A | * | 9/1996 | Gross et al. .................. 706/45 |
| 5,813,007 | A | | 9/1998 | Nielsen |
| 5,852,812 | A | | 12/1998 | Reeder |
| 5,893,091 | A | | 4/1999 | Hunt et al. |
| 5,973,612 | A | | 10/1999 | Deo et al. |
| 5,974,406 | A | | 10/1999 | Bisdikian et al. |
| 5,999,978 | A | | 12/1999 | Angal et al. |
| 6,021,403 | A | | 2/2000 | Horvitz et al. |
| 6,055,505 | A | | 4/2000 | Elston |
| 6,055,570 | A | | 4/2000 | Nielsen |
| 6,122,633 | A | | 9/2000 | Leyman et al. |
| 6,138,158 | A | | 10/2000 | Boyle et al. |
| 6,151,643 | A | | 11/2000 | Cheng et al. |
| 6,167,448 | A | | 12/2000 | Hemphill et al. |
| 6,173,284 | B1 | | 1/2001 | Brown |
| 6,185,613 | B1 | | 2/2001 | Lawson et al. |
| 6,208,996 | B1 | | 3/2001 | Ben-Shachar et al. |

(Continued)

OTHER PUBLICATIONS

Berndtsson et al., "Cooperative Problem Solving: A New Direction for Active Databases", 1996, 4 pages, 2 pages of citation.*

(Continued)

*Primary Examiner*—Don Wong
*Assistant Examiner*—Michael Le
(74) *Attorney, Agent, or Firm*—Amin, Turocy, & Calvin, LLP

(57) ABSTRACT

The present invention relates to a system and methodology to facilitate timely delivery of notifications and performance of automated actions for users in the framework of an ad-hoc rules processing environment. An information agent operates as a distributed application to perform automated actions for users in accordance with user preferences and context. Various rules can be executed to delay, inhibit, and/or enable an action such as sending notifications according to the preferences and current user states as determined from the context. The rules can include data centric matching logic, set-oriented execution rules, rule ordering/interaction hierarchies, and ad-hoc Boolean combinations, for example.

27 Claims, 19 Drawing Sheets

U.S. PATENT DOCUMENTS

| | | | |
|---|---|---|---|
| 6,209,011 B1 | 3/2001 | Vong et al. | |
| 6,219,782 B1 | 4/2001 | Khan et al. | |
| 6,256,664 B1* | 7/2001 | Donoho et al. | 709/204 |
| 6,260,148 B1 | 7/2001 | Aggarwal et al. | |
| 6,275,957 B1* | 8/2001 | Novik et al. | 714/39 |
| 6,292,825 B1 | 9/2001 | Chang et al. | |
| 6,314,533 B1 | 11/2001 | Novik et al. | |
| 6,353,926 B1 | 3/2002 | Parthesarathy et al. | |
| 6,400,810 B1* | 6/2002 | Skladman et al. | 379/93.24 |
| 6,405,191 B1* | 6/2002 | Bhatt et al. | 707/3 |
| 6,424,966 B1 | 7/2002 | Meyerzon et al. | |
| 6,438,618 B1* | 8/2002 | Lortz et al. | 719/318 |
| 6,466,949 B2 | 10/2002 | Yang et al. | |
| 6,480,885 B1 | 11/2002 | Olivier | |
| 6,487,548 B1 | 11/2002 | Leymann et al. | |
| 6,510,429 B1 | 1/2003 | Todd | |
| 6,629,138 B1 | 9/2003 | Lambert et al. | |
| 6,643,682 B1* | 11/2003 | Todd et al. | 709/202 |
| 6,662,195 B1 | 12/2003 | Langseth et al. | |
| 6,704,803 B2 | 3/2004 | Wilson et al. | |
| 6,751,657 B1 | 6/2004 | Zothner | |
| 6,826,560 B1 | 11/2004 | Leymann et al. | |
| 6,829,639 B1 | 12/2004 | Lawson et al. | |
| 6,829,770 B1 | 12/2004 | Hinson et al. | |
| 6,839,730 B1 | 1/2005 | Ramabhadran | |
| 6,910,033 B2 | 6/2005 | Rosenblum | |
| 6,910,070 B1 | 6/2005 | Mishra et al. | |
| 6,938,240 B2 | 8/2005 | Charisius et al. | |
| 6,981,250 B1 | 12/2005 | Wiltamuth et al. | |
| 6,988,262 B1 | 1/2006 | Mallory et al. | |
| 2001/0009016 A1 | 7/2001 | Hoffman et al. | |
| 2002/0010804 A1* | 1/2002 | Sanghvi et al. | 709/318 |
| 2002/0032597 A1 | 3/2002 | Chanos | |
| 2002/0032602 A1 | 3/2002 | Lanzillo et al. | |
| 2002/0032771 A1 | 3/2002 | Gledje | |
| 2002/0035482 A1 | 3/2002 | Coble et al. | |
| 2002/0069244 A1 | 6/2002 | Blair et al. | |
| 2002/0075293 A1 | 6/2002 | Charisius et al. | |
| 2002/0077842 A1 | 6/2002 | Charisius et al. | |
| 2002/0080938 A1 | 6/2002 | Alexander et al. | |
| 2002/0082919 A1 | 6/2002 | Landau et al. | |
| 2002/0087649 A1* | 7/2002 | Horvitz | 709/207 |
| 2002/0087740 A1 | 7/2002 | Castanho et al. | |
| 2002/0095399 A1 | 7/2002 | Devine et al. | |
| 2002/0120711 A1 | 8/2002 | Bantz et al. | |
| 2002/0136173 A1 | 9/2002 | Monroe et al. | |
| 2002/0154010 A1* | 10/2002 | Tu et al. | 340/517 |
| 2002/0164729 A1 | 11/2002 | Kuebert et al. | |
| 2002/0194305 A1 | 12/2002 | Sadeghi et al. | |
| 2003/0046539 A1 | 3/2003 | Negawa | |
| 2003/0050046 A1 | 3/2003 | Conneely et al. | |
| 2003/0083952 A1 | 5/2003 | Simpson et al. | |
| 2003/0101322 A1 | 5/2003 | Gardner | |
| 2003/0131143 A1* | 7/2003 | Myers | 709/318 |
| 2003/0154193 A1* | 8/2003 | Rosenblum | 707/3 |
| 2003/0177402 A1 | 9/2003 | Piazza | |
| 2004/0002988 A1 | 1/2004 | Seshadri et al. | |
| 2004/0128359 A1 | 7/2004 | Horvitz et al. | |

OTHER PUBLICATIONS

Vassili Bykov, "TOPlink for SmallTalk 5.0: What's new, what's old?", Sep. 1999.

U.S. Appl. No. 10/180,360, filed Jun. 26, 2002, Seshadri et al.
U.S. Appl. No. 10/376,197, filed Feb. 26, 2003, Seshadri et al.
U.S. Appl. No. 10/373,328, filed Feb. 24, 2003, Pather et al.
U.S. Appl. No. 10/375,628, filed Feb. 26, 2003, Pather et al.
U.S. Appl. No. 10/375,300, filed Feb. 27, 2003, Seshadri et al.
BEA SYSTEMS, "Event Subscription and Notifications", 2000, 4 pages, printed Jul. 25, 2005 from http://e-docs.bea.com/tuxedo/tux71/html/dvlibra7.htm.
Hanson, et al., "A Flexible and Recoverable Client/Server Database Event Notification System", VLDB Journal, 1998, vol. 7, pp. 12-24.
"Configurable Interface for Processing Notifications", Aug. 19, 1999, www.sba.widener.edu/saphelp, printed Mar. 6, 2003, 3 pages.
IEEE, "The Authoritative Dictionary of IEEE Standards Terms", 2000, 7th Edition, p. 701.
"Interactive Notification Server", www.brience.com, Copyright 2000-2000, printed Mar. 10, 2003, 5 pages.
Steve Trythall, "JMS and COBRA Notification Interworking", Dec. 12, 2001, www.oreilly.com, printed Mar. 25, 2003, 9 pages.
Microsoft Corporation, "Global XML Web Services Architecture", White Paper, Oct. 2001, 11 pages.
Microsoft Corporation, "An Introduction to Microsoft Transaction Server", Jan. 8, 1998, printed Oct. 21, 2005 from http://msdn.microsoft.com/archive/en-s/dnarmts/html/msdn_mtsintro.asp, 5 pages.
Ellen Muraskin, "Notification Engines and Apps", Oct. 5, 2001, www.convergence.com, printed Mar. 10, 2003, 11 pages.
"Event Broker/Monitor (BEA TUXEDO System)", 1999, http://edocs.bea.com/wle/wle42/ admin/events.htp, printed Mar. 4, 2003, 5 pages.
Sasu Tarkoma, "Scalable Internet Event Notification Architecture (Siena)", Spring 2002, 9 pages, Helsinki.
Rosenblum, et al., "A Design Framework for Internet-Scale Event Observation and Notification", 1998, 17 pages.
Microsoft Corp., "Microsoft SQL Server Notification Services Technical Overview", Apr. 2002, White Paper, 23 pages.
Rob Taylor, "Transact-SQL", Dec. 20, 2000, SQLTeam.com, 2 pages printed on Jan. 26, 2005 from http://www.sqlteam.com/item.asp?ItemID=1650.
Michael Kantor and David Redmiles, Creating an Infrastructure for Ubiquitous Awareness, Information and Computer Science, University of California, Irvine 92697, 2001, 8 pages.
Bowman, et al. "The Practical SQL Handbook: Using SQL Varients", 2001, pearson technology group, 4th Edition, 4 pgs.
Antonio Carzaniga, Design of a Scalable Event Notification Service: Interface and Architecture, Aug. 1998, U. of Colorado, 16 pages.
Eric Schmidt, "Reliable XML Web Services", Dec. 11, 2001, Microsoft MSDN, 10 pages, last printed on Apr. 7, 2006.
Bernheim Brush, et al., "Notification for shared annotation of digital documents", Apr. 2002, ACM Press, vol. 4, Issue No. 1, pp. 89-96.
Chou, et al., "Versions and change notification in an object-oriented database system", Jun. 1988, IEEE Computer Society Press, Paper 20.4 275-281.
Gruber, et al. "High-level constructs in the READY event notification system", Sep. 1998, ACM Press, p. 195-202.
IEEE, "The Authoritative Dictionary of IEEE Standards Terms", 2000, 7th Edition, p. 701.

* cited by examiner

Ad-Hoc Boolean Rules

Rule evaluation (aggregation across template results)

Predicate template execution

| | Pred-1<br>From (X) | Pred-2<br>To (Y) | ...... | Pred-K<br>Subject contains(Z) |
|---|---|---|---|---|
| Rule 1<br>From(Phil) and<br>To(SqlPMs) | Phil | SqlPMs | | |
| Rule 2<br>To(SqlPMs) and<br>Contains("Urgent") | | SqlPMs | | Urgent |
| ) .......... | | | | |
| Rule N | | | | |

Individual rule execution

Fig. 11

EXPRESSION AND FLEXIBILITY FRAMEWORK FOR PROVIDING NOTIFICATION(S)

REFERENCE TO RELATED APPLICATION(S)

This application is a continuation in part of U.S. patent application Ser. No. 10/180,360 which was filed Jul. 26, 2002, entitled System and Method for Providing Notification(s), the entirety of which is incorporated herein by reference.

TECHNICAL FIELD

The present invention relates generally to computer systems, and more particularly to a system and method for routing notifications in accordance with an information agent.

BACKGROUND OF THE INVENTION

Empowering people to make well-informed decisions has become increasingly important in today's fast-paced environment. Providing individuals with relevant and timely information is an essential element in facilitating such well-informed decisions. However, certain information that is noise to some may be very valuable to others. Additionally, some information can also be temporally critical and as such there may be significant value associated with timely delivery of such information. Moreover, some individuals prefer to stay apprised of information, even though not critical. A challenge is to provide information in a desired manner notwithstanding vast differences in individuals' information and delivery preferences.

Many conventional methods of gathering information require proactively requesting and searching for the information, often mandating sifting through dozens of messages, hundreds of articles, or referencing numbers or trends in reports. Furthermore, existing technologies assume that a person desiring such information is at a computer and has time and ability to retrieve the information. Moreover, people are increasingly mobile and cannot always be within close proximity of a computer. As a result, Internet-enabled mobile devices are becoming increasingly popular and have generated demand for services that deliver timely, personalized information regardless of location, on whatever suitable device is available and accessible.

Some have attempted to accommodate such demand by building systems that allow individuals to subscribe to an application that automatically delivers information of interest. However, most of such information delivery systems have been poorly built employing ad-hoc techniques. Additionally, conventional systems have difficulty with respect to scaling because of the complexity associated with processing meaningful queries in connection with a large number of disparate events or publications, and delivering results to subscribers given the varying types of individual delivery preferences as well as recipient device types. Consequently, conventional notification systems are inefficient, difficult to maintain and administer, unreliable, and are inadequate for hosting large-scale applications.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and methodology for performing automated actions such as routing communications in accordance with an expression and flexibility framework. In one aspect of the present invention, an information agent is provided that performs the automated actions (e.g., deliver notifications, display an alert, store information for later use) for users based upon personal preferences. Preferences can be modeled as a complex subscription within the information agent infrastructure. A preference is a subscription to perform a set of conditional checks (instances of predicate definitions) when a particular event occurs. When the conditions of the preference are true, then the automated actions indicated in the preference definition can be taken. The information agent can be a distributed application that participates in various systems/networks to automatically assist users according to adaptable and/or configurable preferences. In addition to the preferences, current user states such as relating to user context (e.g., busy, relaxed, traveling, present) are maintained in order to manage communication flow to the user, wherein various rule scenarios can be executed to facilitate timely actions and timely reception of wanted communications while mitigating annoyances such as SPAM and telemarketing. The rules can operate according to several models including data-centric matching logic, set oriented execution for processing multiple rules and messages, and/or other rule interactions for handling multiple users and conditions.

According to one aspect of the present invention, the information agent includes a rules processor that receives state information to determine when and if automated actions should occur and/or notification events should be routed to one or more notification sinks. The rules processor analyzes user-defined rules or conditions that indicate a user's preference for being interrupted or notified in view of the state information, wherein various data can be collected and processed for the state information. Such information can include user context information, application states, device states, and/or subscription states generated from one or more events.

In another aspect of the present invention, the rules processor performs a database join operation that matches conditions indicated by the state information in accordance with preferences that are defined by users of the information agent. Based upon the state information, events, and preference information, the rules processor can then enable or disable the automated actions. In one example, notification events may be enabled or disabled from being passed to a message delivery component that employs one or more communications protocols to deliver messages to notification sinks. Furthermore, depending on the user's preferences, priority of the events, subscription information, and/or state information, the rules processor can delay when the events are allowed to pass to the user in order to mitigate unwanted interruptions and facilitate efficient delivery of automated services.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other

BRIEF DESCRIPTION OF THE DRAWINGS

FIG. 11 is a diagram illustrating ad-hoc rule processing in accordance with an aspect of the present invention.

DETAILED DESCRIPTION OF THE INVENTION

Figure 1:
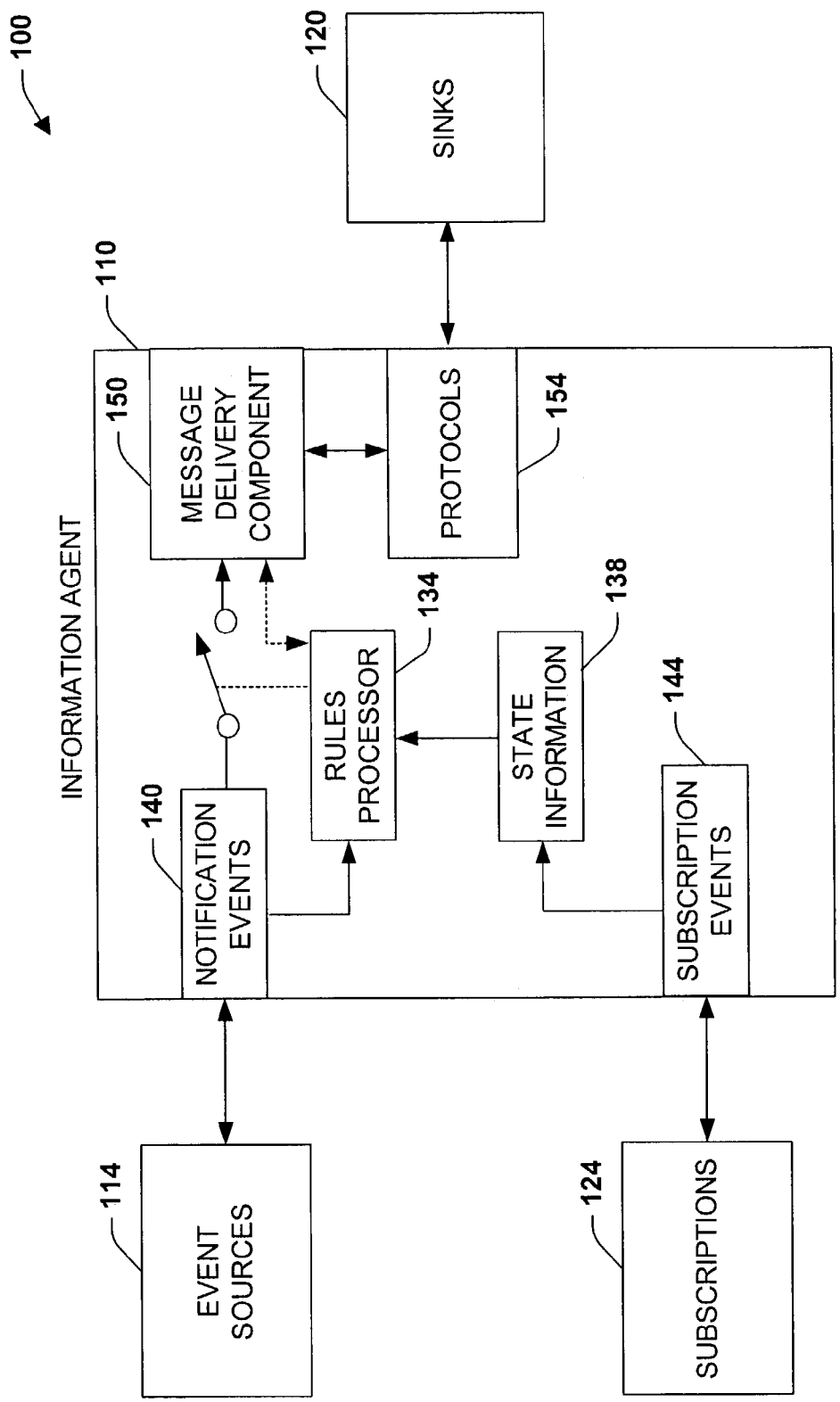
FIG. 1 is a schematic block diagram of a notification routing system in accordance with an aspect of the present invention.

The present invention relates to a system and methodology to facilitate timely delivery of notifications and performance of automated actions for users in the framework of an ad-hoc rules processing environment. An information agent operates as a distributed application to perform automated actions for users in accordance with user preferences and context. Various rules can be executed to delay, inhibit, and/or enable an action such as sending notifications according to the preferences and current user states as determined from the context. The rules can include data centric matching logic, set-oriented execution rules, rule ordering/interaction hierarchies, and ad-hoc Boolean combinations, for example. The following examples illustrate how preferences, context, and rules can be defined/processed by the information agent when deciding to perform an automated action such as to send notifications: "Notify me on my cell when an important e-mail arrives" (context not as relevant if message is important enough); "Notify me of meeting location change on cell"; "Don't interrupt with an Instant Message request while presenting" (context of presenting inhibits instant message requests); "If voice message left at work after hours, store message as text file" (multiple preference conditions solved before sending e-mail home); "If an alert event is detected, buzz my cell phone three times and dial this emergency number."

As used in this application, the terms "component," "service," "agent," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a notification routing system 100 is illustrated in accordance with an aspect of the present invention. The system 100 employs an information agent 110 (can include multiple agents or parts thereof acting in concert) to distribute information from one or more event sources 114 that generate notifications to one or more notification sinks 120 that receive information from the sources. In order to receive information from the event sources 114, one or more subscriptions 124 are obtained to determine which of the event sources cause automated actions to occur at the notification sinks 120. For example, a news subscription may include notifications from three different news sources such as a breaking news source, a sports source, and a financial news source. If a subscriber has suitably subscribed to this type news subscription, then notifications that are generated from any of the three sources can be passed to the notification sinks 120, wherein the information agent 10 selects when and if information from the event sources 114 is passed or routed to the sinks. In another aspect, the information agent 110 processes the event sources 114 and performs one or more automated actions based upon user preferences and context which are described in more detail below. Thus, the notification sinks 120 can be modeled as components or devices that can receive directives from an automated action (e.g., modify display, sound alert, store data, generate text messages, turn on or off a device for user).

It is noted that the system 100 can operate in accordance with a notification platform (not shown) that performs various database and communications operations. The notification platform can thus collect or aggregate information from one or more of the event sources 114 and generate notifications to the information agent 110 based on the collected information, wherein the information agent then distributes the collected information to the notification sinks 120 or performs automated actions at the sink. It is also noted that various systems and components can be provided to facilitate operations between the notification platform, event sources 114 and notification sinks 120 which are described in more detail below.

The information agent 110 includes a rules processor 134 that receives state information 138 to determine when and if actions are to be performed such as determining when notification events 140 should be delivered or routed to the notification sinks 120. The rules processor 134 analyzes user-defined rules or conditions that indicate a user's preference for being interrupted or notified in view of the state information 138 (e.g., if call from home, then notify immediately, if message from golfing partner, then notify me this evening, unless I am currently not busy). Various data can be collected and processed for the state information 138. This can include user context information (e.g., busyness, focus, attentional state, goals, user-defined state, away from desktop, and so forth), application states (e.g., busy typing, chatting on instant messenger, no desktop activity for 30 minutes, e-mail program not open), device states (e.g., active, busy, off), and/or subscription states provided from one or more subscription events 144 that indicate the user's eligibility to receive actions from the event sources 114 (e.g., flags communicated across network indicating account has not been activated, account suspended/active).

In one aspect of the present invention, the rules processor 134 performs a database join operation that matches conditions indicated by the state information 138 in accordance with preferences that are defined by users of the notification sinks 120. Based upon the state information 138, subscription events 144, and preference information, the rules processor 134 can then enable or disable the notification events 140 (or other events that may cause rules to perform actions) from being passed to a message delivery component 150 (e.g., communications module, message queue, transaction coordinator, resource manager, e-mail application, voice application, automated action component) that employs one or more communications protocols 154 to deliver messages or perform actions at the notification sinks 120. In addition, depending on the user's preferences, priority of the notification events 140, and/or state information 138, the rules processor can delay when the notification events are allowed to pass to the notification sinks 120 (e.g., buffer notification event for several hours, and pass message to user's cellphone after working hours).

It is noted that various protocols 154 can be provided to facilitate discovering, describing, subscribing, processing and receiving notifications in accordance with the information agent 110. These protocols 154 can include asynchronous protocols such as a routing protocol for message delivery between a plurality of nodes (e.g., protocol describes end-points of delivery having multiple hops between nodes). Other protocols 154 include various XML protocols such as Simple Object Access Protocol (SOAP) and Web Service Description Language (WSDL), for example, that can be adapted in accordance with various schemas for subscribing, delivery, and receiving notifications from the event sources 114. Messages or notifications can also be processed according to one or more delivery protocols that interact with commercially available network servers/databases associated with a notification platform for processing large amounts of notification data. Such delivery protocols can be executed by the message delivery component 150 that includes message queuing functions operating with database applications involving event provider and event collector processes to determine if messages have been suitably delivered to the notification sinks 120. These processes can interact with one or more Distributed Transaction Coordinator (DTC) functions or transactions in the message delivery component 150, for example, in order to process/transmit data from multiple event sources 114 in a reliable manner.

Figure 2:
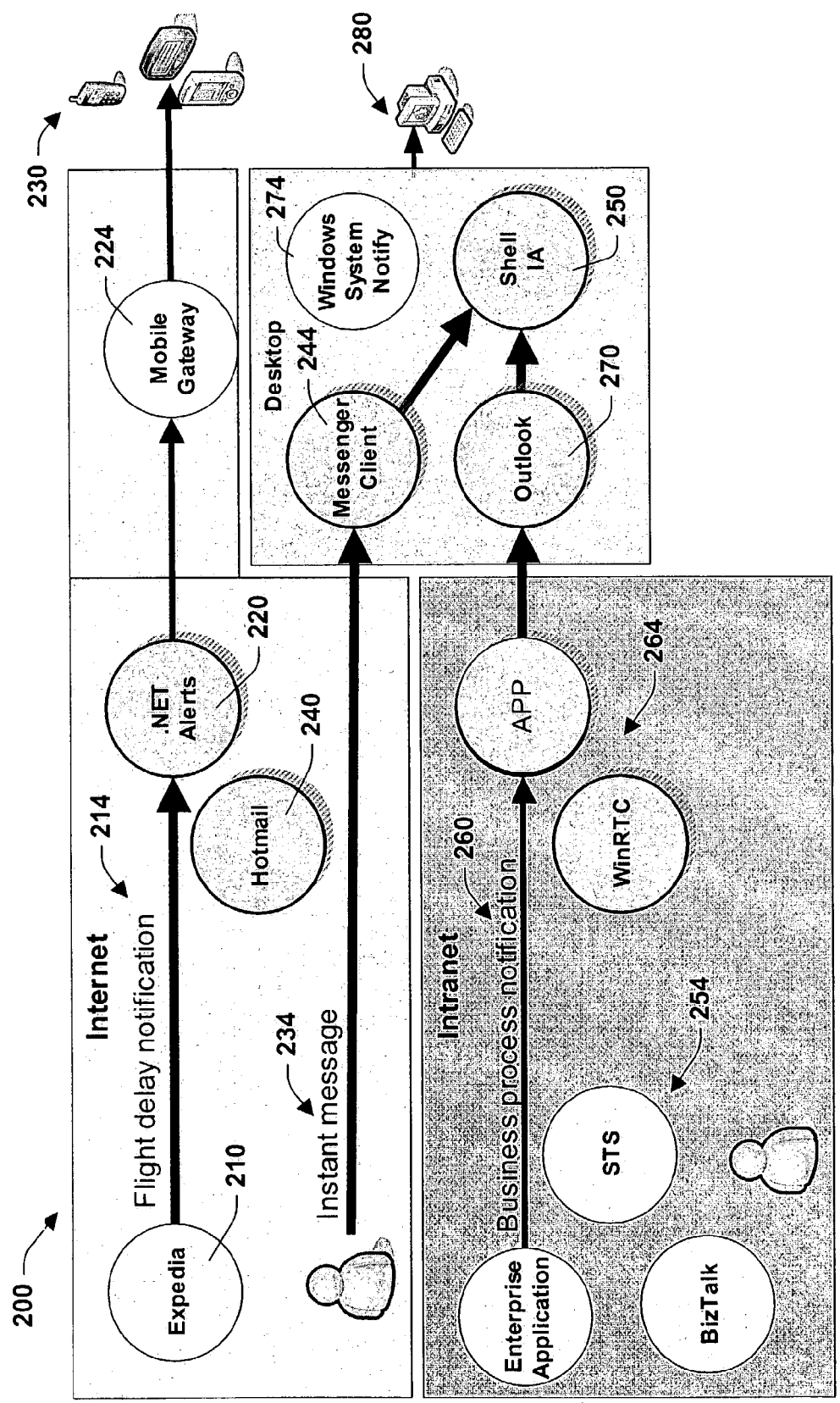
FIG. 2 is a diagram of various distributed routing examples in accordance with an aspect of the present invention.

Referring now to FIG. 2, a system 200 illustrates various distributed routing examples in accordance with an aspect of the present invention. Before proceeding with a detailed discussion of the information agent described above, various routing examples are depicted in the system 200 to demonstrate the distributed processing nature of the present invention. It is to be appreciated however, that the examples illustrated in the system 200 are not exhaustive of the plurality of possibilities or options that can be provided in accordance with the subject invention. In one example, a flight notification service 210 (e.g., flight notification service) issues a delay notification 214 across the Internet to an alerting application 220 (e.g., .Net Alerts) that is transmitted through a mobile gateway 224 to one or more mobile devices 230. Similarly, an instant message 234 is transmitted to a mail server 240 (e.g., Hotmail) that communicates with a client application 244 operating with a desktop information agent shell 250. It is noted that the information agent capabilities described herein can be contained within and/or distributed throughout the various components involved in the communications chain such as the alerting component 220, the mobile gateway 224, mobile devices 230, mail server 240, client application 244, other applications, and/or shell 250.

In yet another example, one or more business applications 254 (e.g., Enterprise application, STS (SharePoint Team Services), BizTalk) communicate a business notification 260 across an Intranet to one or more routing applications 264 (e.g., WinRTC) that is received by an e-mail application 270 (e.g., Outlook) and is also routed/processed by the information agent shell 250. Also illustrated in the system 200 is a Desktop Notify Generator 274 for generating local/remote notifications that can be similarly routed as described above. Similar to the Internet examples above, the components in the Intranet communications chain may also include information agent capabilities for routing, processing and/or delivering messages or notifications to a user, wherein the user may have access to the mobile devices 230 and/or one or more computers 280 for receiving the notifications. It is also noted that one or more of the components illustrated in the system 200 may act as notification generators for respective information agents operating therein (e.g., notification platform server(s) aggregating notification events in a SQL database and distributing the notification events to one or more information agents that make routing decisions before passing notifications to users).

Figure 3:
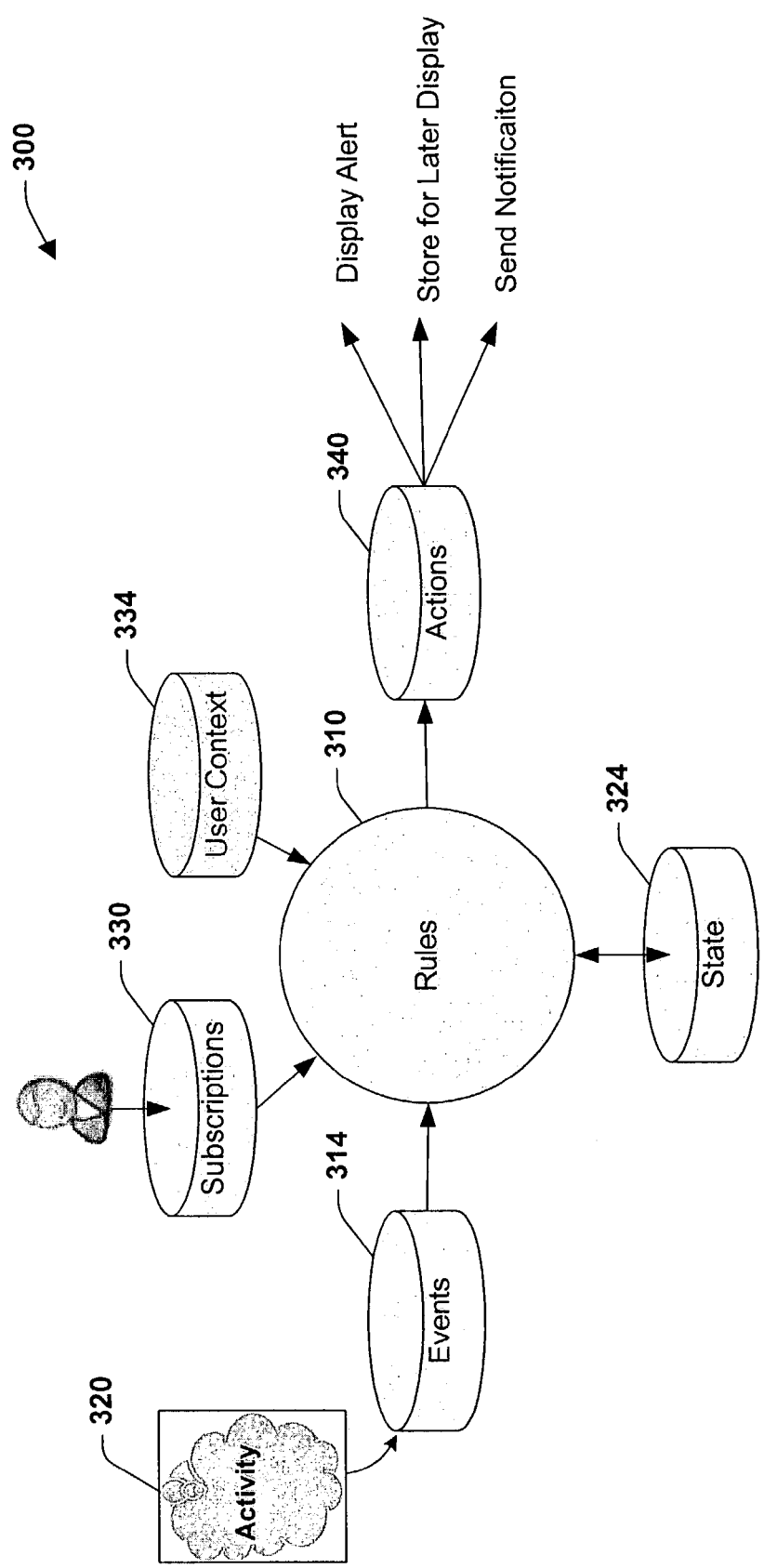
FIG. 3 is a diagram illustrating an exemplary information agent model in accordance with an aspect of the present invention.

Turning to FIG. 3, a system 300 illustrates an exemplary information agent model in accordance with an aspect of the present invention. The system 300 includes a rules processor 310 (e.g., SQL execution engine) that is generally triggered from one or more notification events that are generated from a plurality of notification source activities at 320 (e.g., electronic information generated from various web sites and/or services). As illustrated, the rules processor 310 can consider application state information at 324, subscription state information at 330, and/or user context information 334 which can be supplied from one or more local and/or remote sources (not shown). It is noted that the events 314, state 324, subscriptions 330, and the user context information 334 can be modeled as data (e.g., schemas, data structures), wherein the rules processor 310 employs rules which are described in more detail below that can be modeled as parameterized queries that join data. As can be appreciated, an SQL query processor (not shown) can be employed to perform set-oriented matching via a join expressed in a Transact SQL language and/or managed code logic, if desired. Based on at least one of the events, subscriptions, user context, and state information, the rules processor 310 can cause one or more automated actions 340 to occur (e.g., display an alert, store message for later display, bundle messages and deliver in accordance with another event, send, inhibit, and/or delay a notification to one or more desk top or mobile devices).

Before proceeding with a discussion of FIGS. 4–11, it is noted that various examples and possible implementations of one or more components of an information agent are illustrated. It is to be appreciated that the present invention is not limited to the examples and implementations described herein. For example, rule processing may be achieved via various SQL instructions that are described below. As can be appreciated, various other languages could also be employed to execute the rules in accordance with logical expressions such as C, C++, Visual Basic, X#, C#, and so forth. In general, substantially any rule, context, state, subscription, and/or event, that is processed to cause automated notifications or actions to occur in accordance with user preferences (can be inferred preferences and/or context) is within the scope of the present invention.

Figure 4:
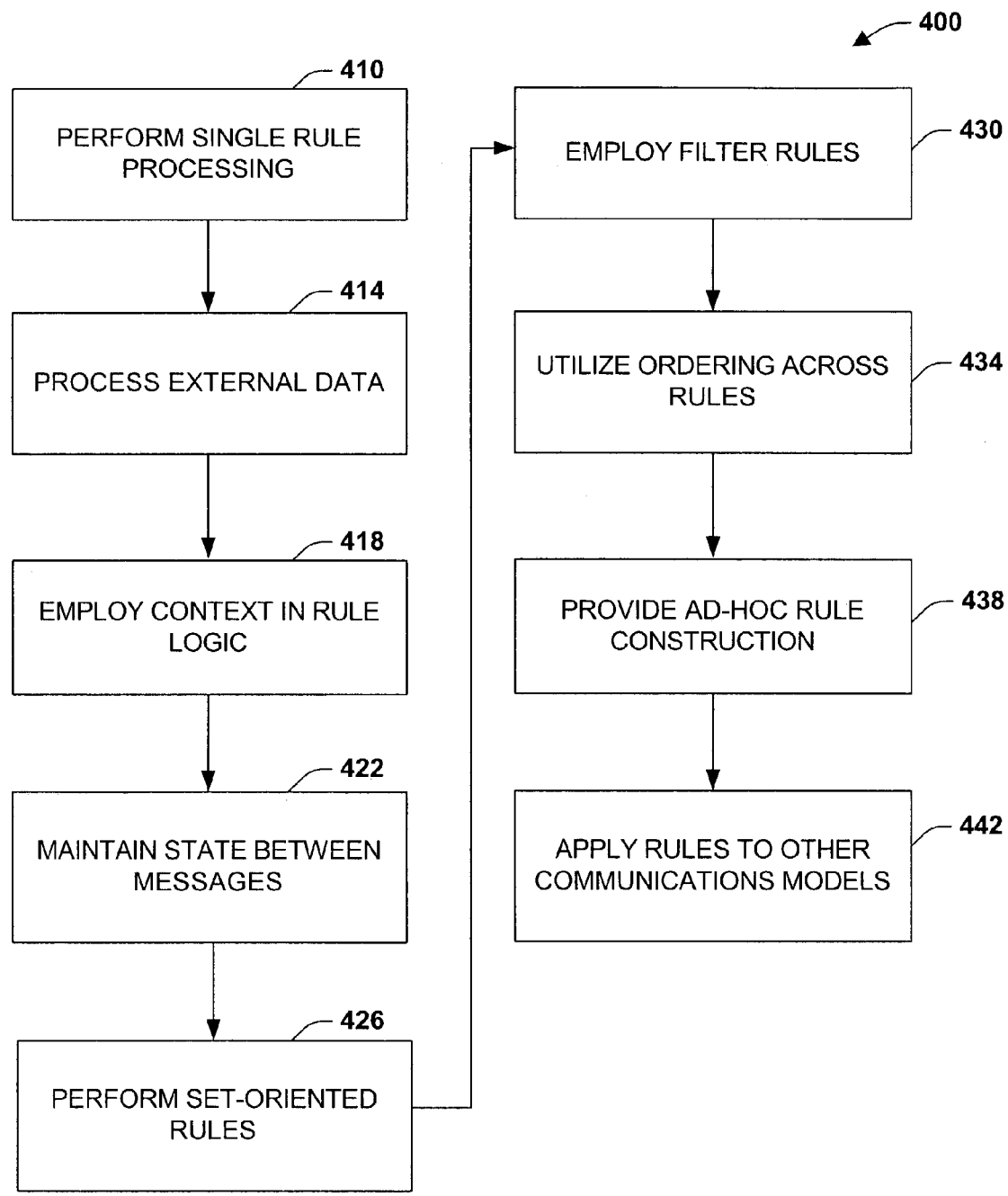
FIG. 4 is a flow diagram illustrating rule execution processes in accordance with an aspect of the present invention.

FIG. 4 illustrates a methodology for rule processing in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 4, various processes 400 are illustrated for processing rules in accordance with the present invention. Although, some of the rule processing examples illustrated in FIG. 4 are directed to e-mail examples, it is to be appreciated that information agent routing can be applied to any various architectures such as routing real time voice and/or images, for example, as is described in more detail below. Proceeding to 410, one example of rule processes depicts single rule processing. For example, an "InBox" rule may be applied to move messages from an explicit list of people to a particular folder. This illustrates some basic platform concepts, and how a set-oriented approach to the basic matching problem works. At 414, the rule processing in 410 can be extended to depend on external data from a received message or notification. For example, an InBox rule such as Move messages from MyBuddies to a particular folder has a dependency on data "external" to the received message. The actual buddies or colleagues of each person are neither part of the rule, nor part of the message. This data is typically are maintained as "external" data in a mail or communications server store. The "external" data can be stored in a SQL Server table. Using organizational data (e.g., My Managers, My Employees) is similar.

At 418, a context can be considered during rule processing. For example, context information relating to a user can be processed as part of a caching operation of available context states which are described in more detail below. At 422, rule processing can involve maintenance of states between messages which may describe a dependency that is tagged to one or more other messages (e.g., Only interrupt me with urgent messages. Queue up other messages to send to me along with the next urgent message).

The following rule processes illustrates set-oriented processing of messages (many messages together) and of rules (many rules together). At 426, set-oriented rule processing is performed. It is noted that one or more stages within an information agent pipeline can utilize set-oriented rule processing and that the present invention is not limited to such processing within any particular stage. For example, the above processing includes how the information agent processes a large number of similarly structured (i.e., templatized) user-defined rules given a relatively high rate of message throughput. Usage of set-oriented matching logic also provides opportunities to scale to one or more servers. At 430, filter rules processing may be achieved. As an example, a rule employing a spam filter can be applied across large numbers of incoming messages. Full-text rule conditions and the use of reverse query indexing technology, for example may also be utilized. At 434, rule ordering may be applied to process a plurality of messages. For example, this process describes how users can impose a partial ordering across their rules, thus constraining their order of execution. Another example allows one rule execution to affect the next rule (e.g., by changing the message priority). At 438, an Ad-Hoc rule process may be achieved by describing how an end-user can construct a rich rule by composing basic templates using Boolean logic. At 442, rule processing can involve real-time communications (or actions) such as a scenario describing phone call routing decisions based on information agent preferences, for example.

Figure 5:
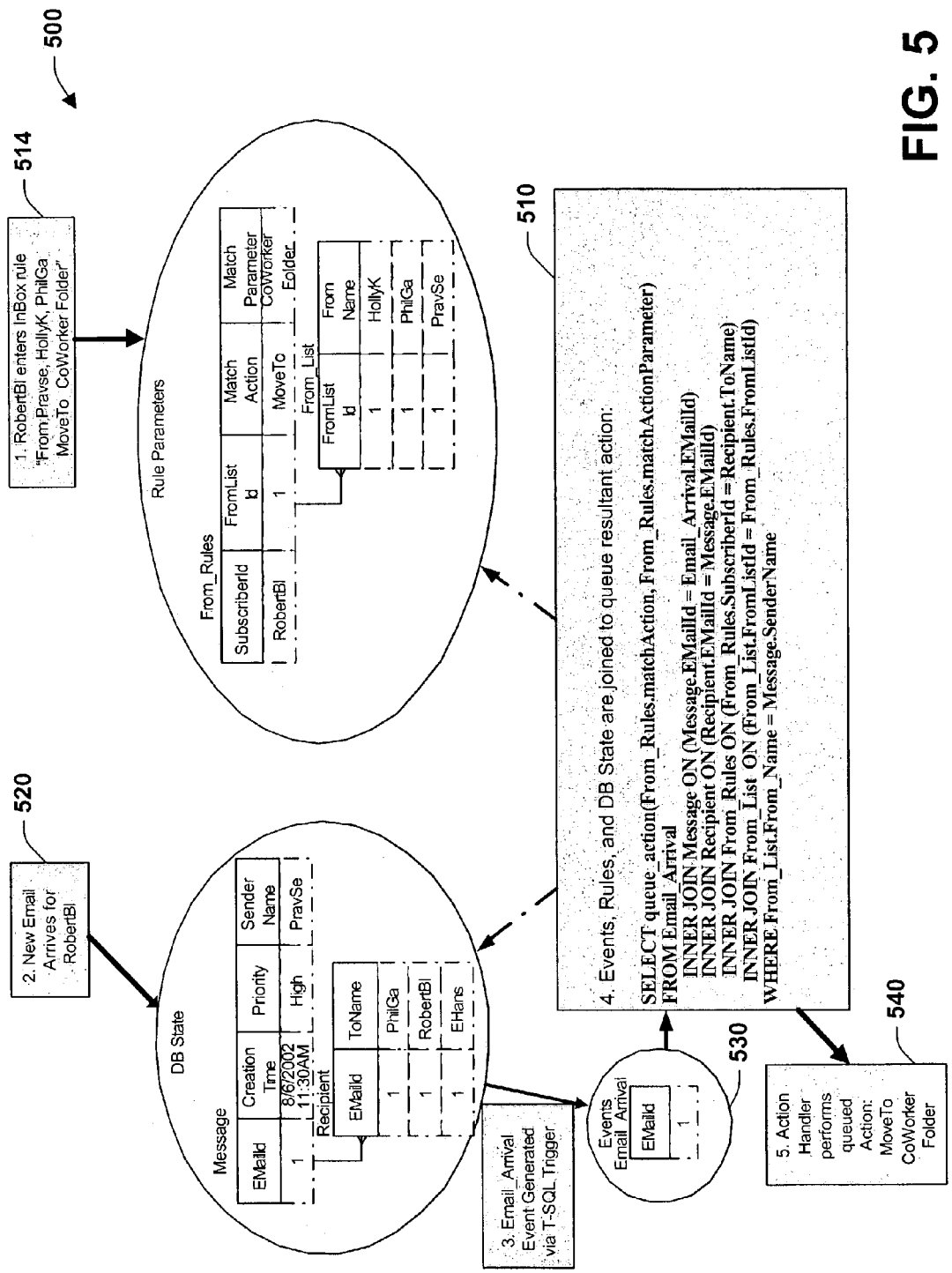
FIG. 5 is a diagram illustrating an example of rule execution in accordance with an aspect of the present invention.

FIG. 5 is a diagram illustrating an example of rule execution in accordance with an aspect of the present invention. Before proceeding with a discussion of FIG. 5, the following example conditions can apply although, as noted above, the present invention can be applied to other communications situations (e.g., phone, PDA, images, video, and so forth or non-communications scenarios such as causing automated actions to occur). FIG. 5 illustrates a system 500 for processing an InBox rule defined for a single user. In this example, the InBox rule is used by a subscriber named RobertB1: The rule stating "From PravSe,HollyK,PhilGa Move To CoWorkersFolder", wherein this rule may be created by a developer by adding a predicate template composed of the items defined for the rule "From . . . and move to . . . ", an end user then adds an instance of the template which is then executed by a SQL information agent. It is noted that the rule itself is an arbitrary combination of one or more items or predicates.

A developer typically defines a template FromRule which may take the following example parameters:

Event—email arrival

Owner—the person (RobertB1) creating the rule

Senders—a set of email senders

MoveToFolder—a folder to move email from any of the Senders.

It is noted that one aspect of the present invention supports application developers extending the system with their own components to promote extensibility of applications.

Thus, new components can be developed such as new event classes, preference classes, actions, and/or new types of predicates, for example.

The rule template is an SQL statement that uses the following tables (created automatically from declarative definitions) in the FROM clause:

Tables representing the parameter values for one or more actual rules

From_Rules: a table with one row per end-user rule, containing the Owner and the MoveToFolder From_List: a table with one row per Sender specified per end-user rule Tables representing new messages that are to be processed Email_Arrival: a table with one row containing a handle to each new email message to be processed Message, Recipients: tables containing the actual message data A SELECT clause of the rule template specifies suitable actions to be queued for processing. In this case, the actions are MoveTo actions with appropriate parameters. An example rule is as follows and is depicted at 510 of FIG. 5:

SELECTqueue_action(From_Rules.matchAction,From_Rules.matchActionP

FROMEmail_Arrival

INNERJOINMessageON (Message.EMailId=Email_Arrival.EMailId)

INNERJOINRecipientON (Recipient.EMailId=Messgage.EMailId)

INNERJOINFrom_RulesON (From_Rules.SubscriberId=Recipient.ToName)

INNERJOINFrom_ListON (From_List.FromListId=From_Rules.FromListId

WHEREFrom_List From_Name=Message.SenderName

The developer also specifies that instances of this rule template should fire when new email messages occur (e.g., email arrival or other message type arrival is the triggering activity).

The end-user, RobertB1, enters the InBox rule using a GUI application such as Outlook, for example. An application developer can provide an interface similar to a Rules Wizard for defining InBox rules. The application developer thus codes the wizard to submit a parameterized FromRule using an API.provided by an information agent platform. The actual list of Senders, the MoveToFolder ("CoWorkers"), and the Owner ("RobertB1") are parameters to the FromRule. Adding a new rule using an API inserts rows into the From_Rules and From_List tables.

Proceeding to the example in FIG. 5, user RobertB1 enters a new InBox rule corresponding to an existing rule template at 514. Sometime afterward, an e-mail arrives from PravSe to RobertB1, PhilGa, and Ehans at 520. As it is received by an Exchange server, for example, the e-mail is written into the associated database tables. The arrival of the new email 520 leads to the insertion of an Email_Arrival event row (possibly using a database trigger) at 530. The Email_Arrival event 530 typically consists of a unique identifier associated with the stored e-mail, since the rest of the e-mail metadata can be referenced with a key in a data store (not shown). The new Email_Arrival event 530 causes an information agent to fire a T-SQL rule template for matching e-mail against InBox rules at 510. In this example, the new mail should indeed be moved to a specific folder— the execution of the T-SQL leads to this action being queued appropriately. A resulting action at 540 will be taken off the queue and handled by an Exchange/Outlook defined action handler or other handler depending on the communications medium and format.

Figure 6:
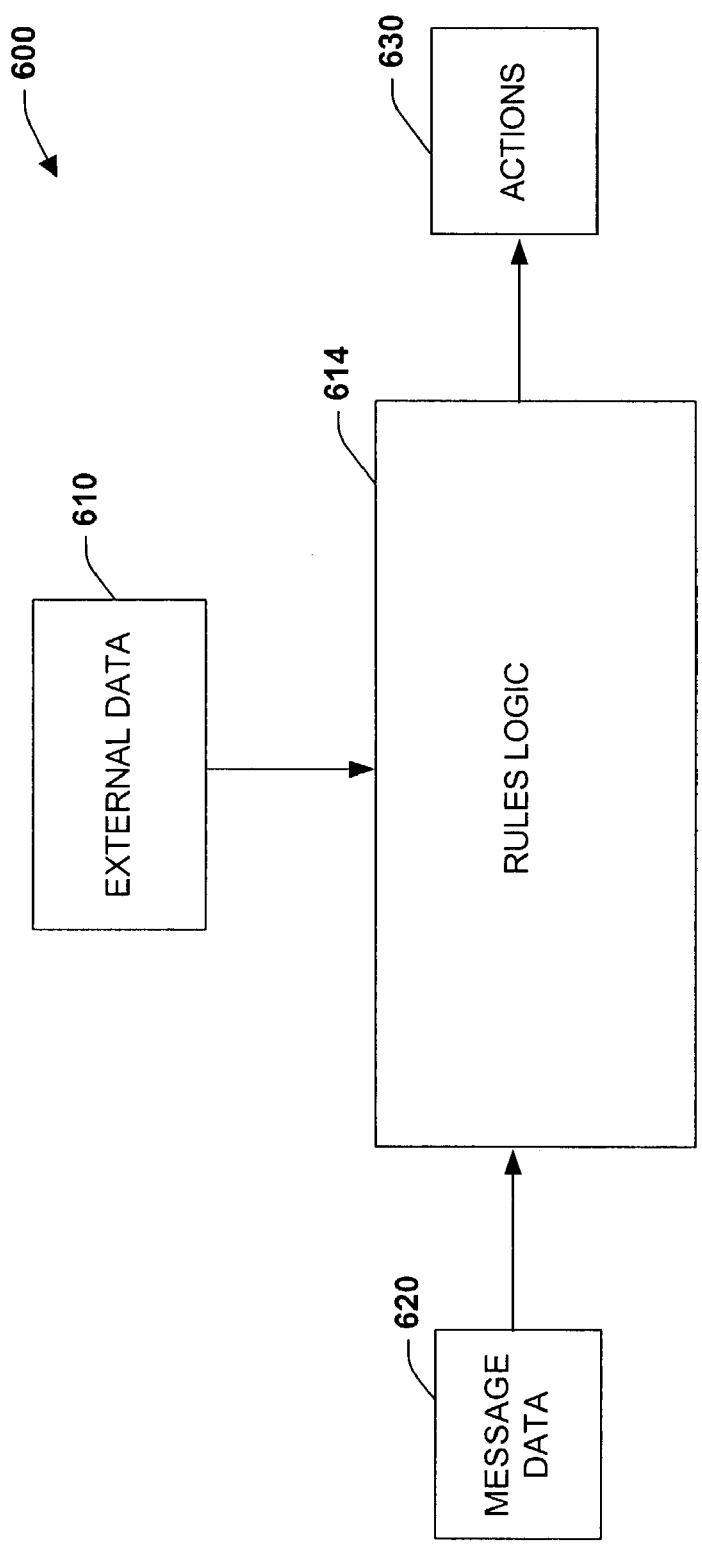
FIG. 6 is a diagram illustrating external data processing in accordance with an aspect of the present invention.

FIG. 6 is a diagram illustrating external data processing in accordance with an aspect of the present invention. In this example, the From_Rule example in FIG. 5 is modified to include a consideration of external data 610 that is processed by rules logic 614 and according to one or more incoming messages at 620 to perform one or more automated actions 630. Instead of specifying an explicit list of people whose mail should move to a particular folder, RobertB1, in this example, wants mail from any of his Buddies to move to the folder. The Buddies are a feature of an associated messaging server, and are maintained in a separate table. Similar to above, a rule template is developed, defining the supporting tables, and defining the rule logic 614, except that the rule defined uses another app-defined table called Buddies that is populated independently. A user then invokes an interface application to supply the parameters to the rule template. During execution, the rule logic 614 accesses both message supplied data 620, and external data 610, such as the buddies table example described herein.

In this example, "external" data 610 is data that is not specified in the rule logic 614, and is not present in the message data 620. In the case of the Buddies example, the external data 610 can be stored locally with a messaging server or agent. In the case of remote data, consider that user RobertB1 moves all mail from one of his Managers to a specific folder. The organizational hierarchy information may be located in a remote server. The remote data can be made available in cached form in a local database as external data 610. Other possibilities include going out to the remote server when needed in a synchronous fashion and/or utilizing a caching/prefetching option implemented outside of the information agent.

Figure 7:
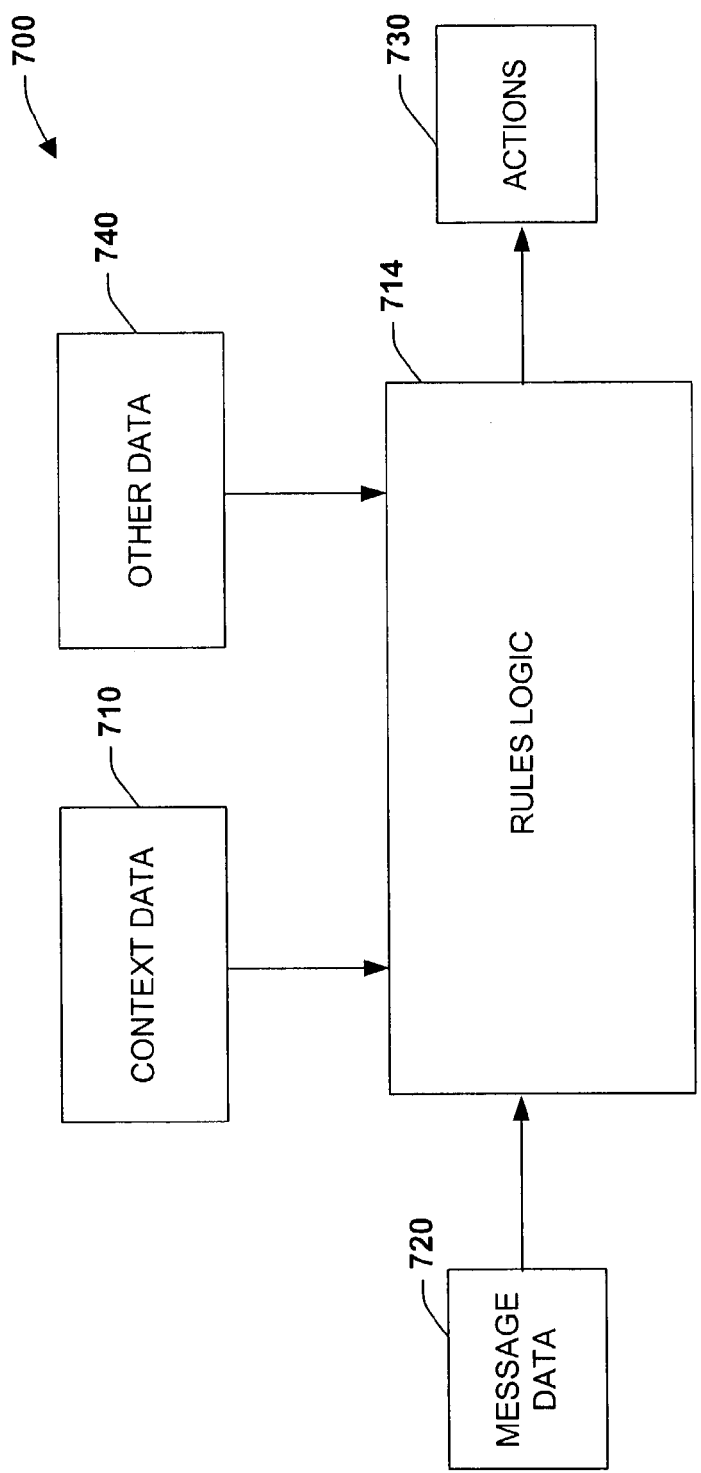
FIG. 7 is a diagram illustrating context data processing in accordance with an aspect of the present invention.

FIG. 7 is a system 700 illustrating context data processing in accordance with an aspect of the present invention. Similar to above, context data 710 is processed by rules logic 714 and according to one or more incoming messages at 720 to perform one or more automated actions 730. In this example, the From_Rule example in FIG. 5 is modified to also include some personal context data 710. User RobertB1 thus sets up a rule to route messages based upon his context. For example:

"From PravSe,HollyK,PhilGa AND IsAvailable Desktop Notify Desktop" An IsAvailable template can be defined that uses a context system (see context model below) supplied table called Presence. An end user then invokes Outlook to supply the InBox rule defined above. Presence information from the context data 710 (used by the IsAvailable predicate) is a component of data or computed from a subset of data, like the Buddies or Managers examples above. This data can also be maintained remotely (e.g., in a WinRTC server).

Thus, a local cached copy may be kept up-to-date with the actual presence or context data 710 on a server. There are several choices with regards to how the cache is maintained:

For example:

Maintained by the application—in this case, the information agent uses the local information;

Maintained by the information agent—in this case, presence changes are treated as an event, and chronicles can be created (with chronicle rules) to maintain and modify local presence information.

There are some basic possibilities with regards to how the cache is kept relatively up-to-date (i.e., how the presence change events are gathered), and many possible combinations of these two possibilities. The particular choices depend on the frequency of presence changes and the amount of data that needs to be moved.

The presence information is pulled from the remote server on a schedule. The information agent platform provides scheduled event providers for this purpose. Also, the remote server itself supports a subscription model whereby specific clients can subscribe to changes in the presence/context of selected people. As these changes occur, the remote server notifies the local server by sending it a message with the changes.

In another example aspect of the present invention, other data 740 can be processed by the rules logic 714. Consider the following rule example; Only interrupt me with urgent messages. Queue up other messages to send to me along with the next urgent message. In this case, state information is tracked across rule execution. There is also an implicit requirement here to send multiple messages together as a one-shot bundle for example. The information agent programming model defines the notion of Chronicles. These are sets of schematized persistent state information (e.g., SQL tables that can be created as part of a rule template definition). Rule templates can specify that the action to take is to insert data into the Chronicle tables. In this case, there would be a single Chronicle table to maintain the queued messages, and the rule logic would add messages to this table if they are not urgent (e.g., priorities system that automatically assigns urgency value).

Another rule template (or another part of the same rule template) specifies that if the new message is urgent, then any queued messages (removed from the Chronicle table) should also be sent along with the new message. The information agent platform provides the abstraction of "digest" notifications to capture the need to send many messages together to the recipient. Similar to above, the rules logic 714 can apply T-SQL rules for this example or other type rules. As a variant, it may be desirable to templatize a rule to specify what it means for a message to be considered urgent. During rule execution, the rules logic 714 utilizes state information stored in the Chronicle tables. Similarly, the same Chronicle mechanism is also relevant to a different scenario: Only interrupt me with urgent messages. Queue up other messages to send to me every hour during working hours. The information agent provides the abstraction of scheduled rules, with the runtime capable of managing large numbers of rules with different recurrence times. Many rules with coincident firing times can be executed together in a set-oriented fashion.

Figure 8:
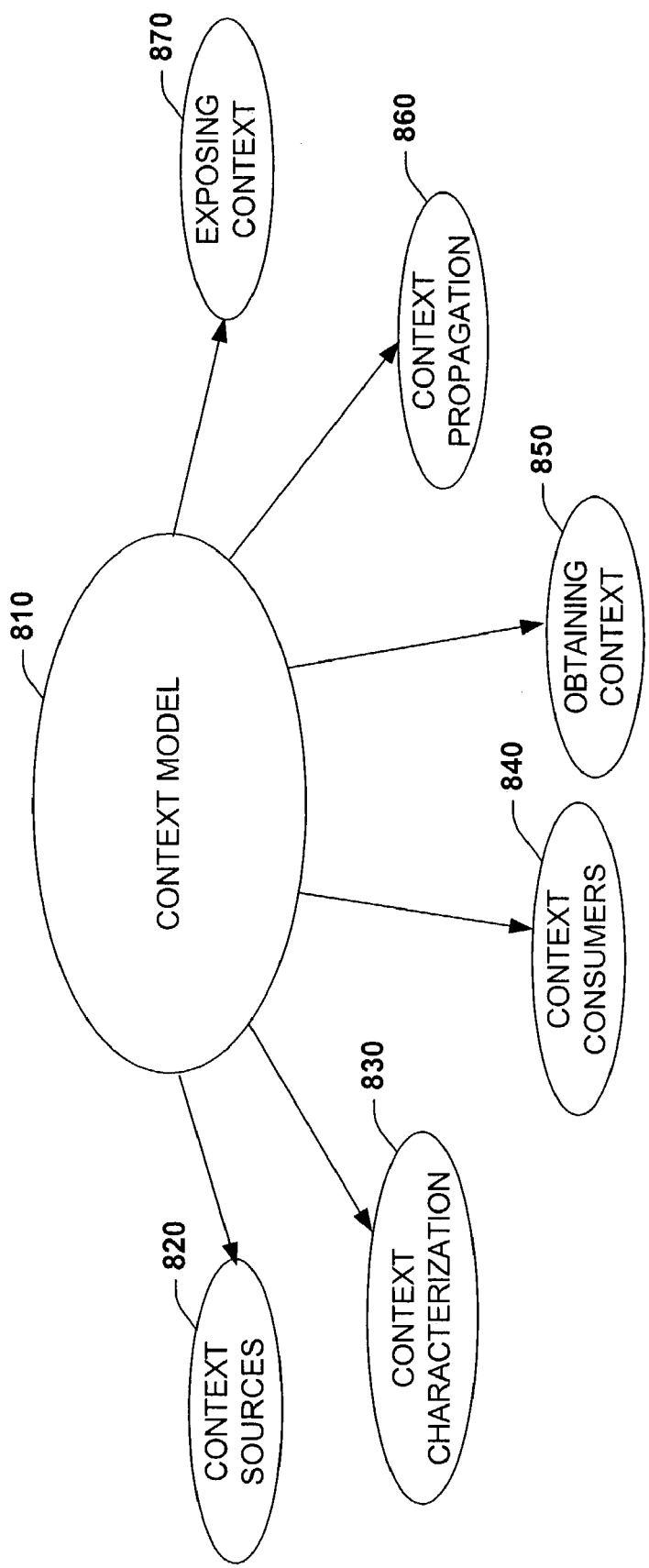
FIG. 8 is a diagram illustrating a model in accordance with an aspect of the present invention.

FIG. 8 illustrates a context model 810 in accordance with an aspect of the present invention. Context Information (or Context) is information regarding the user and the user's activities that enable a system to intelligently generate and route notifications on the user's behalf. Examples of context information include:

Instant Messenger presence information

Exchange calendar information

Physical location information as reported by the cell phone network or a GPS receiver Information collected by the user's system such as whether the user is typing on the keyboard, clicking the mouse, or running an application in full screen model.

Context information typically originates from Context Sources 820. Context information is used by Context Consumers. Context information is propagated from context sources 820 to context consumers by a Context Service. The location of the context source 820 is the Context Origin (or Origin). The location of the context consumer is the Context Destination (or Destination).

Context information can be supplied by a wide variety of context sources 820. These include:

Hardware Context Sources

The system can gather context information by monitoring the status of hardware devices.

1. Keyboard activity.
2. Mouse activity.
3. Phone activity (phone turned on/off, phone conversation underway, etc.)
4. PDA activity.
5. Physical location within the cell phone network.
6. Physical location as reported by a GPS receiver.
7. Web camera linked to image recognition.
8. Microphone linked to voice recognition.
9. Motion sensor.
10. Infrared sensor.

Software Context Sources

The system can gather context information from the Windows operating system and from instrumented applications.

1. Windows
   a. The user is logged in.
   b. The user is running a full screen application.
2. Exchange
   a. Exchange is being used to read e-mail.
   b. Exchange calendar data.
   c. Exchange "Out of Office" status.
3. IM
   a. The IM client is being used to send and receive IN messages.
   b. User entered IM status
4. Internet Explorer or other browser
   a. IE is being used to browse the web.
5. Office
   a. Powerpoint is being used to give a presentation mode.
   b. Outlook is being used to browse e-mail.
   c. Word or Excel is being used to author a document.
6. Windows Media Player
   a. Windows Media Player is being used to play music or video.
7. Third party applications may provide context information.

Pattern Detection Context Sources

The system and application programs can deduce context information by recognizing patterns of behavior. For example, the system might recognize that a user normally logs in and logs out at predictable times on weekdays.

At 830, context characterization can occur.

Context information can be characterized as follows.

Context Source

Specifies who provides the context.

Context Consumer

Specifies who consumes the context.

Utility

Specifies how useful the context information is in generating or routing notifications. Utility is designated as: High, Medium, or Low (or other designation).

Accuracy

Specifies how much trust the system can place in the context information. Some context information is absolutely accurate and trustworthy; other context information may be heuristic or only partially reliable. Accuracy is designated as: High, Medium, or Low (or other designation).

Sensitivity

Specifies how much effort the system must expend to safeguard the context information from unintended disclosure. Sensitivity is designated as: High, Medium, or Low (or other designation).

Origin/Destination/Propagation Distance

Origin specifies the location where the context information originates. Origin is designated as: Desktop, Device, Enterprise Server, Network Service, Carrier Network, and so forth. Destination specifies the location where the context information is consumed. Destination is designated as: Desktop, Enterprise Server, Network Service, and so forth. Propagation distance specifies how far the context information must be propagated to move it from the origin to the destination. Propagation Distance can be designated as: Local (or Intra system), Intranet, or Internet. The propagation distance may influence the performance, reliability, and security of context information propagation.

Volatility Specifies how frequently the context information changes at the context source. Volatility is designated in terms of changes per Second, Minute, Hour, Day, Week, Month, or Year.

Access Frequency

Specifies how frequently the context information is accessed by the context consumer. Access frequency is designated in terms of accesses per Second, Minute, Hour, Day, Week, Month, or Year.

Size

Specifies how much context information is provided, propagated, cached, and consumed. Size is designated in terms of bytes.

User Effort to Maintain

Specifies how much effort the user must expend to maintain accurate context information. It can be presumed that context information that the system automatically maintains on the users behalf and that requires no user effort is more likely to be maintained than context information that the user must maintain manually. It is also likely to be more accurate. User Effort to Maintain is designated as: High, Medium, or Low.

At 840, Context Consumers can be characterized. Context consumers can be characterized as follows.

Context Consumer

Who is the context consumer?

Context Consumer Location

Is the context consumer local to the context source or remote from it?

Context Requirements

What context does the context consumer require? What form of context does the context consumer require: current context from one or more individual context sources, context status changes from one or more individual context sources, summarized context from multiple context sources?

Context Access Frequency

How frequently does the context consumer access context?

Context Freshness

How current or fresh must the context be?

Context Latency

How long can the context consumer afford to wait to acquire fresh context?

At 850, the context model describes Obtaining Context from Context Sources.

The context source can supply context information to a context service in the following manner:

Push on Change

The context source can push the context information to the context service each time the context information changes (or each time the context information changes but no more frequently than a specified interval).

Push on Schedule

The context source can push the context information to the context service on a specified schedule.

Pull on Schedule

The context service can pull context information from the context source on a specified schedule.

Pull on Demand

The context service can pull context information from the context source only when a context consumer requires the context information.

At 860 Context Propagation is considered.

When the context service receives the context information, it can propagate the context information from the origin to the destination in the following manner. It is noted that the context source can supply context information to the context service using one model, while the context service can use a different model to propagate the context information from the origin to the destination.

Push on Change

The context service at the origin can push the context information to the destination each time the context information changes (or each time the context information changes but no more frequently than a specified interval).

Push on Schedule

The context service at the origin can push the context information to the destination on a specified schedule.

Pull on Schedule

The context service at the destination can pull context information from the origin on a specified schedule.

Pull on Demand

The context service at the destination can pull context information from the origin when a context consumer requires the context information.

If the origin contains a Notification Services instance, the context service can implement the above models using event triggered or scheduled Notification Services subscriptions. Push on Change can be implemented as an event triggered subscription. Push on Schedule and Pull on Schedule can be implemented as a scheduled subscription. Pull on Demand can be implemented as a "one-time" scheduled subscription.

At 870, the model exposes Context information to Context Consumers. Context is consumed by rules running within a Notification Services generator or Information agent router. The developer specifies which Context Classes his application uses along with context access predicates by declaring each context class and predicate in an Application Development File (ADF). Each context class also includes one or more pre-defined Context Functions. Rules retrieve context information by calling these context functions. The context functions retrieve context information from the context class's underlying context tables.

Figure 9:
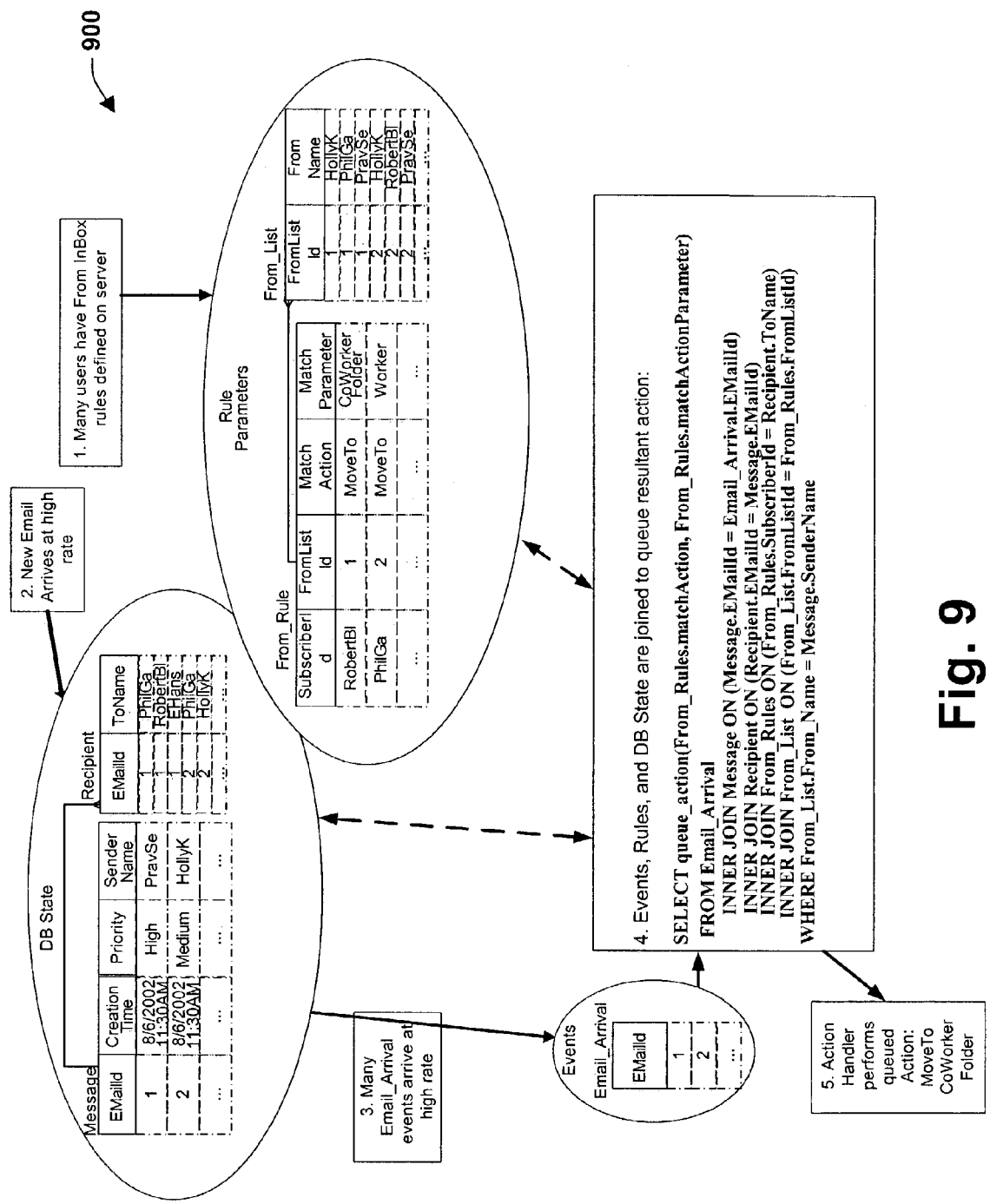
FIG. 9 is a diagram illustrating an example of rule leveraging in accordance with an aspect of the present invention.

FIG. 9 is a system 900 illustrating an example of rule leveraging in accordance with an aspect of the present invention. In this example, an Exchange or Hotmail server hosts e-mail (or other medium) for a plurality of users (e.g., thousands of users). Hosting of several thousand users on a single e-mail server increases the need for a high degree of throughput in processing e-mail arrival events. It is likely a significant number of the hosted users would have rules mimicking the From predicate InBox rule defined for user RobertB1 described above. For example, PhilGa might also have a similar InBox rule such as, "From RobertB1,PravSe,HollyK Move To WorkFolder". The difference between the InBox rules defined for RobertB1 and PhilGa are the parameters, not the fundamental predicates and actions.

Assuming that there is one rule template (FromRule) there may be many actual rule instances. Each mail user may have many rules, and there can be many mail users. Thus, individual rules add another row to the From_Rules table, and corresponding parameter detail information to the From_List table. Several messages arrive together, and are processed together. The rule logic can thus remain the same. It processes a set of messages and a set of rules concurrently, deriving a number of set-oriented efficiencies (locality, indexing, etc). As the sizes of these sets increase, the process becomes more efficient than processing individual rules on individual messages one at a time. Since the rules are modeled as data, suitable database indexes can be built and used to advantage in processing the rule templates. The system 900 illustrates a similar example to FIG. 5 except that there are now sets of events and sets of rules, wherein an example rule is depicted as follows:

SELECTqueue_action(From_Rules.matchAction,From_Rules.matchActionParameter

FROMemail_Arrival
   INNER JOIN MessageON (Message.EMailId=Email_Arrival.EMailId)
   INNER JOIN Recipient ON (Recipient.EMailId=Message.EMailId)
   INNER JOIN From_RulesON (From_Rules.SubscriberId=Recipient.ToName)
   INNER JOIN From_List ON (From_List.FromListId=From_Rules.FromListId)

WHEREFrom_List.From_Name=Message.SenderName

In another example of rules processing, a Spam filtering application may be provided such as:

Filtering by Sender—There is one or more rules with a long list of potential senders, and the action is to delete the mail. A difference from FIG. 5 is that the Owner is no longer a parameter of the rule. The rule is applied to all mail messages, whoever they are addressed to. Clearly, this is a set-oriented operation, and the list of spam sources is simply a set of data that has to be matched against the mail messages being received.

Filtering by Content—There may be a list of words to look for (e.g., XXXStuff) in the content of the message, which identify it as spam for deletion. This is no different from filtering by Sender, except that the rule logic expresses a predicate describing text containment (e.g., Message.Subject CONTAINS BannedList.Keyword). When it is expected that there are a large number of potential keywords to look for, an efficient solution is to use an "inverse query" index over the keywords. Thus, the information agent can integrate PQS technology to provide inverse-query indexing over full-text keyword search conditions, wherein a PQS extension can be invoked within a templatized spam rule.

Figure 10:
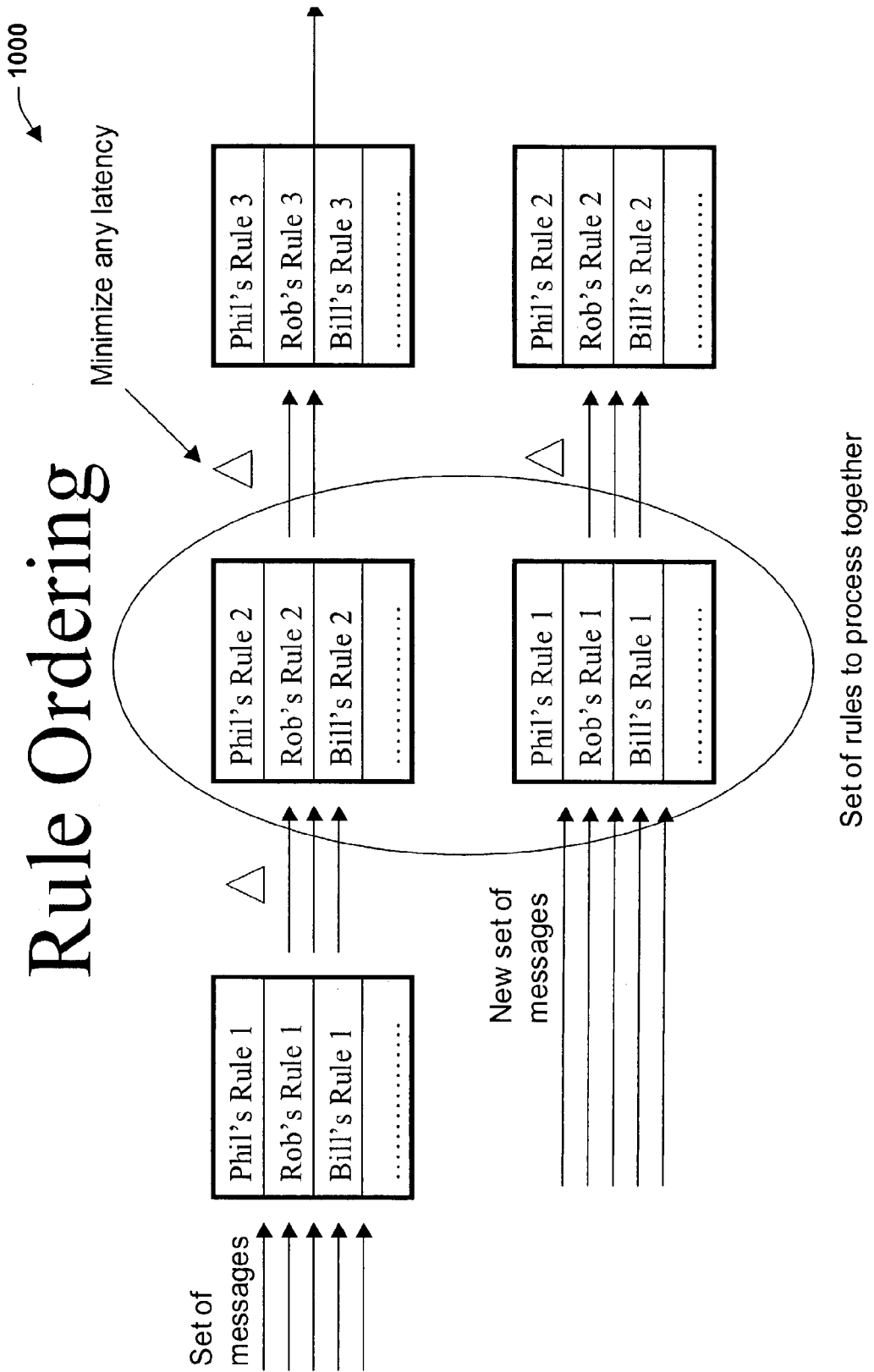
FIG. 10 is a diagram illustrating rule ordering and processing in accordance with an aspect of the present invention.

FIG. 10 is a diagram 1000 illustrating rule ordering and processing in accordance with an aspect of the present invention. Assume user RobertB1 specifies multiple rules, such as:

1. "From PravSe,HollyK,PhilGa SetImportance High", or
2. "Importance High Notify Phone"

One example of InBox rule behavior is to execute the first rule, and make sure the importance is high if it is from PravSe, HollyK, or PhilGa. The second rule will notify RobertB1 on the phone if a high priority message is received. Note the first rule can have a side effect upon the message making it eligible for processing by the second rule. However, information agents adapted in accordance with the present invention can process several messages concurrently as described above. In addition the information agent can receive pending messages for processing while continuing to process messages requiring more processing time. A message arriving between the processing of rule one and two can thus be processed concurrently with the processing of rule two.

FIG. 11 is a diagram 1100 illustrating ad-hoc rule processing in accordance with an aspect of the present invention. In this example, user RobertB1 wants to build a rule with an ad-hoc condition combining several basic predicates. For example, "From PravSe,HollyK,PhilGa AND Importance High Notify Desktop". Each user may have a different Boolean combination of basic predicates. There may be a relatively small number of basic predicate templates (e.g., <100), but clearly a large number of potential combinations of predicates. In this example, no two actual rules are structurally similar. At first glance, it may appear that one way to execute these rules is one-at-a-time. Certainly, this is possible by defining a single rule template. This template takes a query/rule definition as its parameter. Executing the rule template corresponds to executing each rule definition parameter value. However, this limits the gains from set-oriented behavior with respect to processing multiple rules together.

One at a time processing can be improved since a few basic predicate templates are shared across the rules. Thus, each predicate template can be a Boolean function that acts on parameters. Some of these predicates may involve looking at other stored data (e.g., MemberOf (<groupName>)). Many different predicates belonging to the same predicate template can be evaluated together in a set-oriented manner such as illustrated in the diagram 1100. To support ad-hoc rules, the information agent can provide the following abstractions:

A set-oriented Boolean predicate template: This is similar to a regular rule template, except that instead of actions, it can record a Boolean value for every predicate instance evaluated on every message.

A set-oriented Boolean master rule template: This is similar to a regular rule template, but with some dependencies on one or more Boolean predicate templates. One of the parameters to the rule is a Boolean expression combining the results of the dependent Boolean predicates.

Other aspects of ad-hoc rule processing in an information agent can include:

Each user defined ad-hoc rule statement is a combination of rule templates and basic Boolean operators such as AND, OR, NOT, XOR and so forth.

The predicate templates are leaves of a parse tree. Predicate templates are defined using T-SQL, so therefore have the familiar semantics of SQL Server.

Each predicate template capable of being included in an ad-hoc expression calls an agent supplied resultant function within the SQL statement. The resultant function would update system state associated with the user and message to indicate whether the rule template operation returned true.

Each application defines a master rule template. Triggered execution of the master rule template can provide the following:

Initialize per user per message state (system and application defined). Note all Boolean results are initialized to false.

Execution of all Boolean resultant rule templates (e.g., From, Importance, etc.). Only updates to true state are applied to the per-user per-message system state via the resultant function supplied by the system.

Post evaluation of the Boolean results according to the ad-hoc expression. This is achieved in a set-oriented fashion for many users at the same time using SQL aggregate functions.

If result of ad-hoc statement is true, then take user defined action

Many of the examples discussed thus far have employed email inbox rules. As noted above, a plurality of other mediums may be employed with an information agent system. For example, when an information agent is used to facilitate a more real-time communication (e.g., telephone-call-routing). A messaging server (e.g., MSN Alerts) may desire to provide call routing capabilities to a large number of users. One basic rule is: "If the call is not picked up on my primary phone within 4 rings, and it is from one of my Buddies, then route it to my cell phone". It is noted that the information agent does not have to be associated on the actual real-time communication path. The information agent capability is typically associated with initiating the communication (e.g., as part of call setup). It is also noted that the above noted capability does not have to be implemented within the information agent itself—the agent can merely have interfaces to communicate with an external network infrastructure, such as a PBX system, for example.

One manner to facilitate communications is to process the failure to pick up the call in 4 rings as a failure to execute the action of forwarding the call. Action failure can thus be modeled as an event, like other events, and thus trigger fresh rule activity. Another example is to provide an abstraction in the information agent programming model to deal with the failure to execute the call action (after 4 rings) such as extending the model to define a fail-over action (in this case, route to my cell phone).

Figure 12:
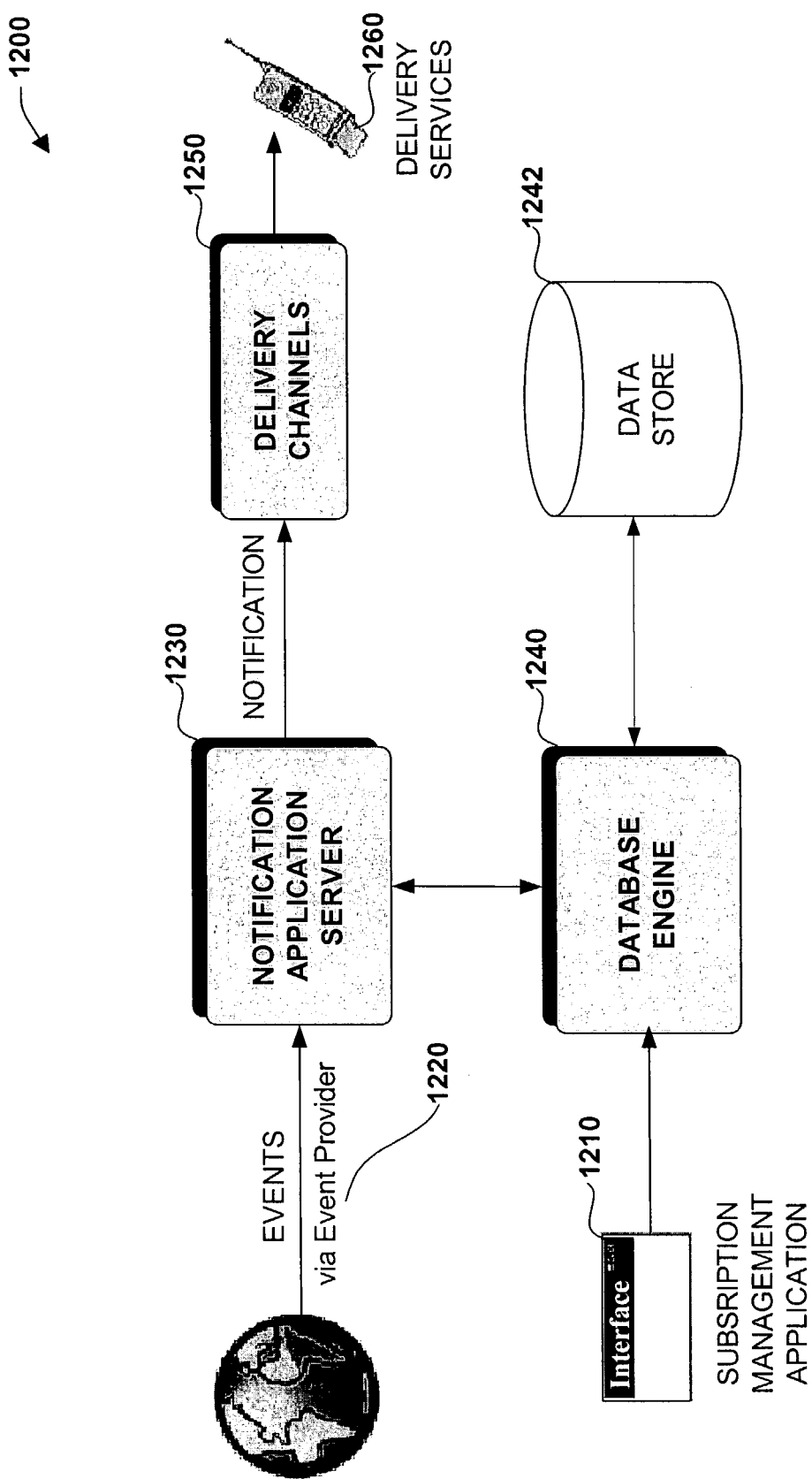
FIG. 12 is schematic block diagram of a notification application architecture in accordance with an aspect of the present invention.

Referring to FIG. 12, a system 1200 illustrates a notification application architecture in accordance with one aspect of the present invention. The notification system 1200 facilitates delivery of information to entities that have subscribed to an application. The system 1200 provides for high-scalability and affords for disseminating information to subscribers in a desired manner according to specific subscriber preferences. A subscriber is an entity (e.g., a person or application) that has subscribed to the notification system 1200. A subscription in accordance with the present invention can be an expressed interest in certain information (e.g., stock price or results of a sporting event), and the specification of a delivery mode (e.g., e-mail, voice mail, delivery via PDA, desktop computer, cellular telephone, television . . . .). Moreover, the present invention also provides for taking into consideration an individual's present state and associated delivery preferences according to present state. Thus, the notification system provides for dynamically modifying deliver modes given the type of information to be delivered, the criticality associated with the information, the subscriber's present state, and the deliver preferences given the aforementioned other parameters. One aspect of the invention that facilitates the system 1200 providing such highly scalable notification services is the employment of modeling subscriptions as data. Such subscription modeling mitigates the need to run queries individually per event per subscriber. Accordingly, numerous events can be concurrently processed with respect to a plurality of subscribers and relevant notifications provided to the respective subscribers in a meaningful manner in accordance with individual subscriber preferences.

Information that subscribers are interested in is collected as events. For example, a stock price at a specific time can be an event, as is a sports score, or a product delivery message—almost any suitable real world "happening" can be expressed as one or more events in accordance with the subject invention. A notification is a message delivered to a subscriber-specific device that contains information related to a subscription. A notification might contain a message about a new high value for a specific stock or the final score for a sporting event for example. The server notification services provide interfaces for gathering subscriptions and events, and then produces notifications based on this data.

Instead of treating individual subscriptions as queries, the notification system 1200 treats individual subscriptions as parameter data (e.g., an application developer can define a set of parameterized queries, each of which can be a subscription class)—evaluation of large numbers of subscriptions becomes a set-oriented data processing problem, for which database engines (e.g., SQL server) are well suited. This is a foundation of the notification system-programming framework of the present invention. In this model, event-triggered subscriptions are evaluated by simply executing a database join between events and a potentially large set of subscriptions. In general, the notion of modeling subscriptions as data is based on an assumption that if the notification system 1200 defines various domains, then many queries will have a common structure. For instance, many subscribers are interested in stock values, but at a finer granularity respective subscribers desire information about different stocks at different values. Thus, an interest in a particular stock can be expressed as "STOCKSYMBOL" and "TRIGGERPRICE" so as to provide a common framework or parameter(s) for such information. The semantics of how these parameter values are interpreted in relation to the event data can be are defined by the application. Thus, the application fixes the logic of how subscription parameters are interpreted (e.g., one app may want to alert when current price>trigger price and another may want to alert when current prce<trigger price)—such semantics can be resolved in advance by the application developer, and designed such that a subscriber cannot introduce new semantics.

As discussed in greater detail below, the subject invention also encompasses a programming model for building subscription applications. In subscription applications a user establishes subscriptions or declarations of interest in certain kinds of targeted information. Thereafter, when the information becomes available, the subscription application sends a notification to the subscriber. A function of a subscription application is to match incoming data with the set of user subscriptions to determine what notifications need to be delivered. The subject programming model allows an application developer to write a small amount of application specific code (e.g. a mix of XML, SQL, C#, C++, VB and other languages suitable for support by the .NET framework) to build a fully-functional, rich subscription application. To enable such functionality, an execution engine can be built on top of SQL Server and the .NET frameworks, for example, that implements fundamental data constructs and execution semantics common to subscription applications. Thus, the subject programming model reduces development time, facilitates application maintenance and increases application efficiency by leveraging the power of a server, for instance SQL Server, to do subscription and event matching.

The subject invention includes a declarative programming model for building subscription applications. The programming model provides a base framework for the structure of applications; and a developer can adapt the base framework to build a specific application.

With respect to the high-level schematic illustration of the system 1200, five components of notification services cooperate to provide the functionality described above. A subscription management application 1210 provides an interface for subscribers to submit subscriptions as input to the system 1200. In particular, the subscription management application 1210 provides numerous application programmer interfaces (APIs) that facilitate entities to provide subscription services via the system 1200—the APIs are discussed in greater detail infra. Event data can also gathered from external sources via an event provider 1220. For example, an event provider in accordance with the present invention can gather or be pushed relevant events from a plurality of resources (e.g., newspapers, magazines, websites, libraries, individuals, employers, government(s), etc.). A database engine 1240 stores events and/or subscriptions in a data store 1242, and also runs statements, like Transact-SQL statements, and stored procedures. It is to be appreciated that the database engine 1240 can also process events versus subscriptions in real-time without persistently storing information. A notification application server 1230 processes subscriptions based on a set of events and ultimately generates notifications that are delivered to subscribers, and which can be stored in the database 1242 if desired. Finally, delivery channels 1250 route the generated notifications to delivery services 1260, which can include, but are not limited to, Exchange servers, SMS servers, and .NET Alert Web services.

Figure 13:
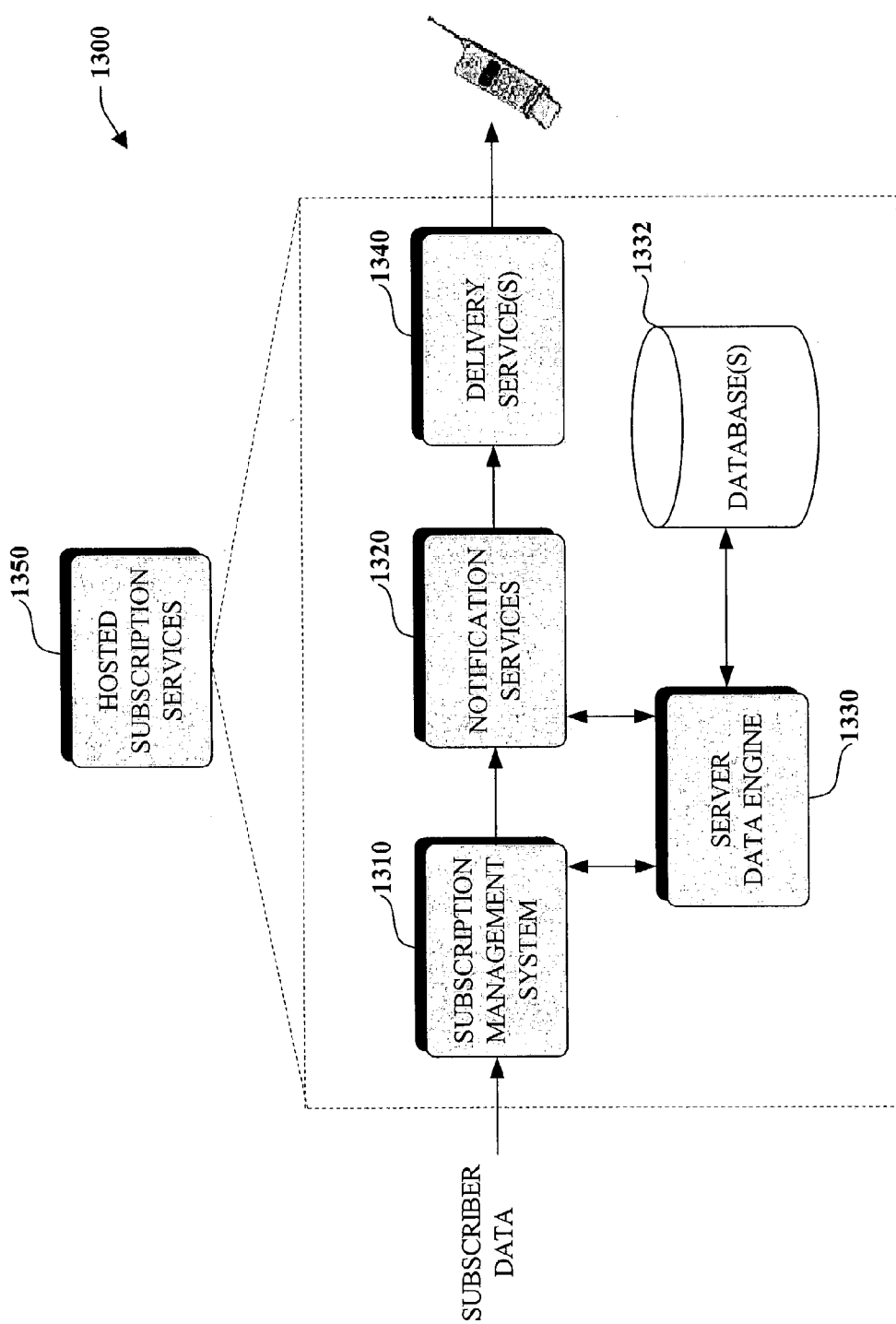
FIG. 13 is a schematic block diagram of a notification creation and distribution system in accordance with an aspect of the present invention.

FIG. 13 illustrates a notification creation and distribution system 1300 in accordance with an aspect of the present invention. The system 1300 includes a subscription management system (one or more subscription management applications) 1310, notification services 1320, a data engine 1330, database(s) 1332, delivery services 1340, and one or more subscription services 1350 hosted by the notification system 1300. The server database engine 1330 provides for processing and storing instance and application data. In particular, the server database engine 1330 stores and retrieves instance and application information from database(s) 1332. The data engine 1330 also provides other services employed by the notification services 1320. For example, the notification services 1320 can employ Transact-SQL language to join event and subscription data via the data engine 1330. Such integration provides scalable performance gains, because the data engine 1330 is likely to be highly optimized for joins as a result of the information processing capabilities afforded by SQL services. The subscription management system 1310, provides a hosting environment for user interfaces that collect subscriber and subscription data as well as accommodate a variety of unique subscription services 1350. The subscription management system can employ a Windows® application for submitting subscriber and subscription data, or can use an automated process for loading subscriber and subscription data from another system. The delivery services 1340 (e.g., NET Alerts and Microsoft Exchange Server) receive notifications from the notification services 1320 and send the notifications to appropriate subscribers.

Functionally, events are submitted to the server data engine 1330 through a hosted event provider in notification services 1320, or through a non-hosted event provider outside of notification services. If employing a non-hosted event provider, another system may be used that supports the event provider, such as a Web server. In addition, it is appreciated that the notification services 1320 can be deployed on a single server or scaled across multiple servers.

Figure 14:
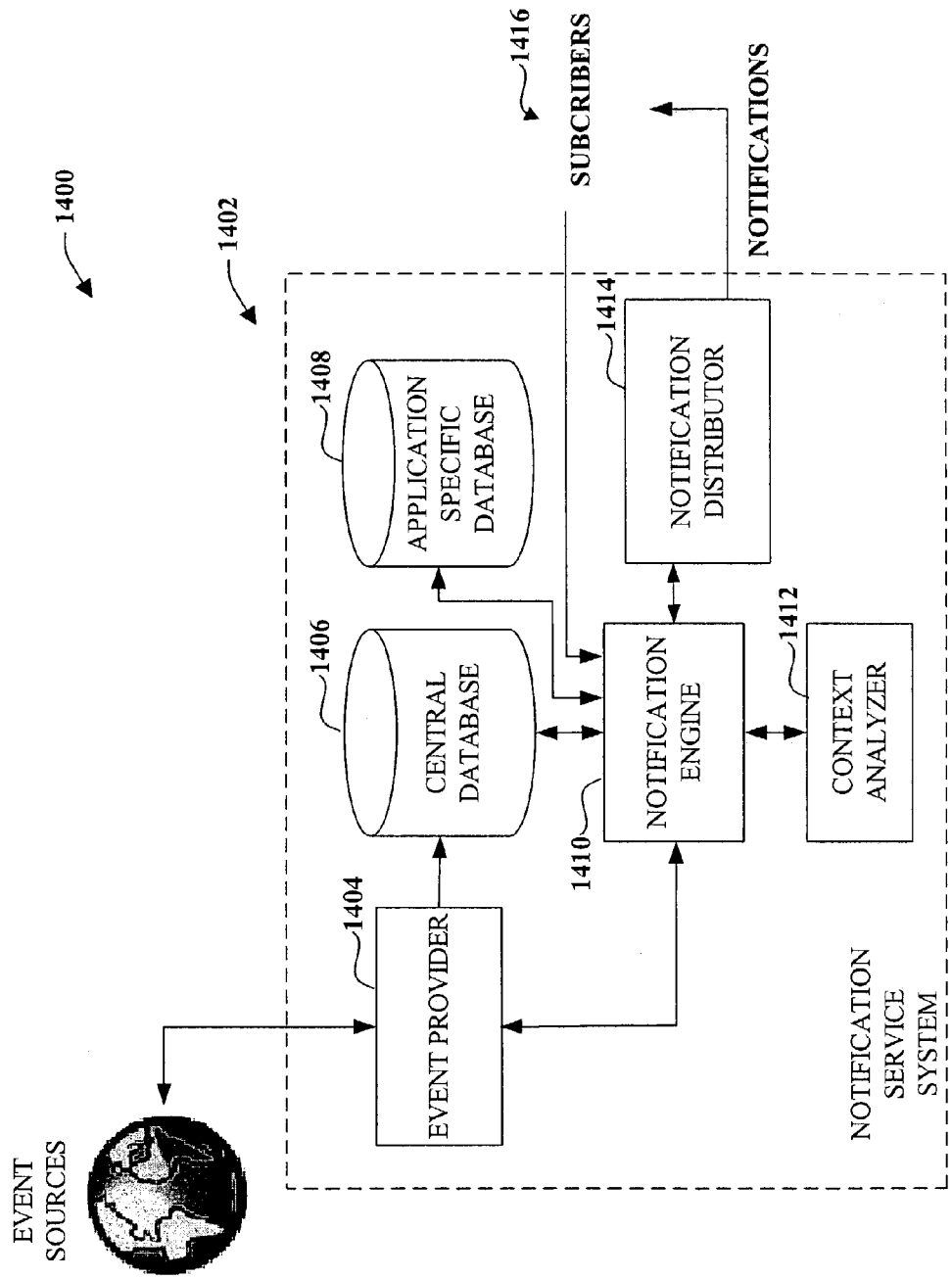
FIG. 14 is a schematic block diagram illustrating a notification service architecture in accordance with an aspect of the present invention.

Referring next to FIG. 14, a notification service architecture 1400 is illustrated in accordance with an aspect of the present invention. The architecture 1400 includes a notification services system 1402, which includes an event provider 1404, a central database 1406, an application-specific database 1408, notification engine 1410, context analyzer 1412, notification distributor 1414, and subscribers 1416. The notification services system 1402 receives input in the form of events and subscriber data, and supplies output or notification to subscribers 1416.

The event provider 1404 acquires events from event sources for the notification services system 1402. Events represent data changes in the external world. For example, a stock price at a specific time is an event, as is a sports score, or a product delivery message. Stated differently, events are items that are potentially interesting to some set of users, and such set of users define the particular input data via subscriptions. The event provider 1404 is employed to collect selected events from event sources for the notification services 1402. Moreover, the event provider 1404 can collect event data from a plurality of different sources including but not limited to communications, such as Internet and network-based communications, and telephony communications, as well as software services, XML files, applications, and databases.

Event sources are defined generally herein as that which generates events, which can also be referred to as notifications or alerts, intended to alert a user, or a proxy for the user, about information, services, and/or a system or world event. An event source can also be referred to as a notification source. Furthermore, the event provider 1404 can monitor and gather data through various methods. Exemplary methods of gathering data include but are not limited to, monitoring directories for file additions, checking system and application log files for certain types of entries, trapping alerts from applications, monitoring web pages, tracking changes in database tables, and reviewing data provided by web services. In most cases, an event provider can gather data from any suitable resource, provided that an application is prepared that retrieves events from the resource. In general, there are a variety of different models that can be employed by the event provider 1404 to collect data. These models can influence how often and under what circumstances the event provider 1404 will collect events from event sources.

In addition, the event provider 1404 can be notified or provided with data in at least one of two manners. The event provider 1404 may wait for information to be "pushed" or sent to it, or it can "pull" information from a source by polling the source and gathering any new or updated data. For example, if a user desires to be notified each time a headline story on a favorite news page changes, the event provider 1404 can be implemented so that it monitors that page and searches for changes to the headline text, for example. When the text changes, the event provider 1404 can extract the new headline data for the notification services system 1402. In the above example, the event provider 1404 is responsible for gathering needed data, because the data is not provided to the event provider from the event source as would be the case with employment of a push methodology.

Furthermore, the event provider 1404 can obtain new data for the notification system 1402 based on either a schedule or on the occurrence of an event that meets pre-defined criteria. A scheduled event provider can run periodically, based on settings implemented by an application developer. The scheduled event provider will start running, retrieve and submit new event data and then hibernate until a next scheduled trigger time. An event-driven event provider can monitor an event source by running continuously. Thereafter, when data that meets a particular criteria for collection is made available the event provider will collect and submit the event. Alternatively, an event-driven event provider may only run in response to a callback function or some other external stimulus. This external function would then determine whether there is valid event data to collect, and use the event provider as the means of collecting such data. Once the event provider 1404 collects data from an external event source, it writes the data to an event table in batches and saves the event table to database 1408.

Data is preferably handled in batches for the sake of efficiency—event data and notification data are both batched. A batch, as generally defined herein, can be a set of data processed as a group. For example, an event batch can be a set of events that are submitted to notification services 1402 at one time. Events can be written to the system either individually or as a group. When a single event is written to the system and there is not an event batch open, one can be created automatically. The new event and subsequent events are then associated with this automatically created batch. The event provider that is providing these events is programmed to close the current event batch periodically, which submits this batch of events for use in notification generation. A new event batch is then created with the first new event submission, and the cycle starts again. Furthermore, when events are written to the system as a group, each group is automatically assigned an event batch. When the writing process is completed, the event batch is closed so that these events are available for notification generation processes. In one particular embodiment of the invention, the batches are atomic (e.g., either the entire batch or none of it is submitted).

Figure 15:
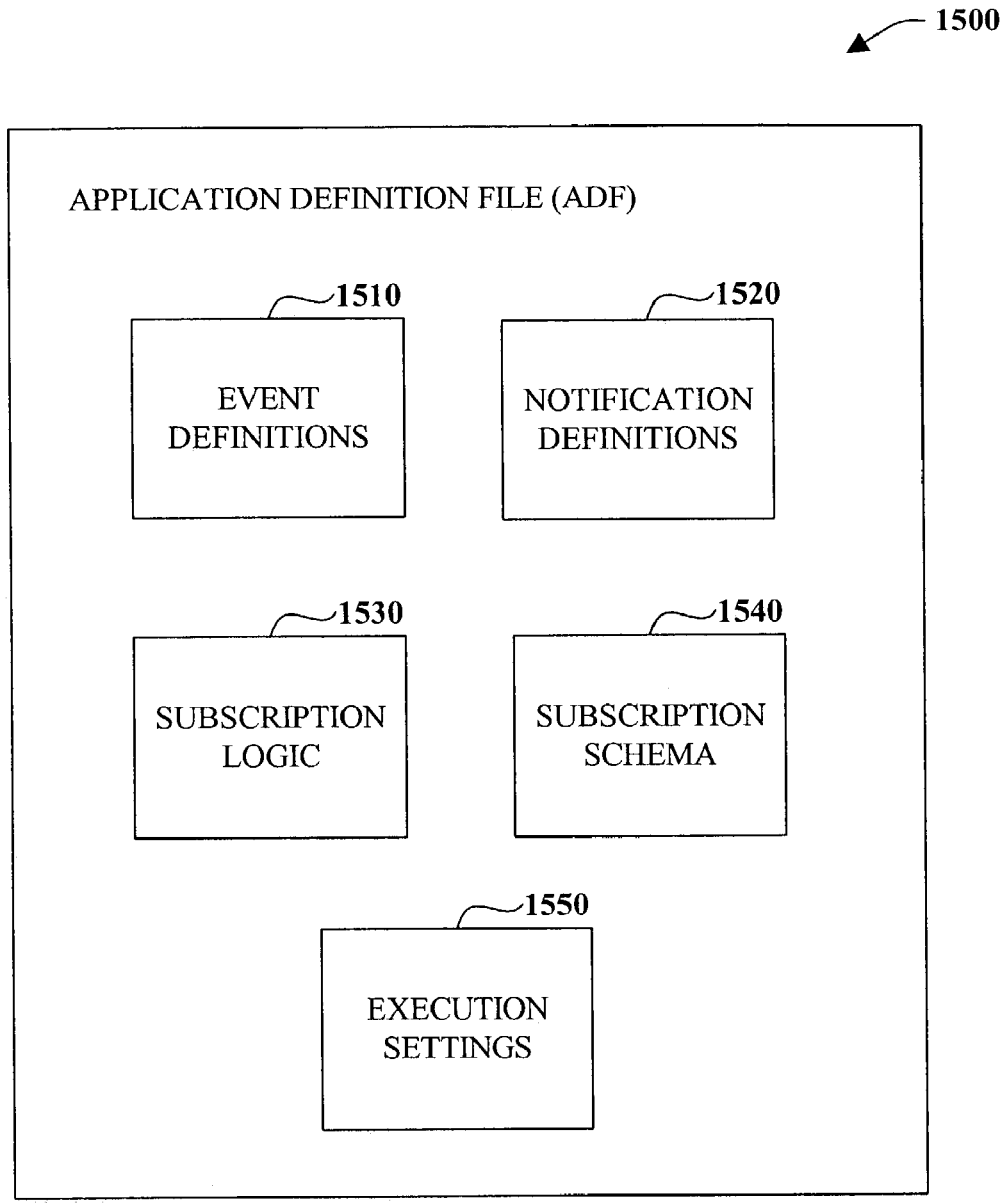
FIG. 15 is a block diagram depicting an ADF and its components in accordance with an aspect of the present invention.

Turning to FIG. 15, a block diagram depicting an ADF 1500 and its components is illustrated in accordance with an aspect of the present invention. The ADF 1500 defines central logic of the application and contains schemas for events, subscriptions, and notifications; the rules for matching events with subscriptions; and may provide the name of the file used to format generated notifications. The ADF 1500 generally includes five components: event definitions 1510, notification definitions 1520, subscription logic 1530, subscription schema 1540 and execution settings 1550. It is to be appreciated that the functionality of the various components can be combined into a lesser number of components or extrapolated into a larger set.

The event definitions 1510 specify structure of event data, the event providers that collect the data, and the structure of any event chronicles used by the application. The notification definitions 1520 specify the structure of raw notification data, the formatting for the messages that will be sent to subscribers, and the delivery protocols used to send the messages. The subscription logic 1530 defines how subscriptions are evaluated. Transact-SQL statements, for example, may match subscriptions to events, or evaluate subscriptions at certain recurring times. Additionally, subscription logic 1530 can be parameterized in a well-defined manner, so that individual subscriptions can personalize the subscription logic. Further, the subscription schema 1540 defines the structure of the subscription parameters, and evaluation times define when subscriptions are to be evaluated. Finally, the execution settings 1550 allow an application developer to enhance behavior and performance of the application when executed by notification services.

Additionally, the application developer may define application settings in several sections of the application definition file (ADF). These settings specify such items as the machines that host notification services, and execution schedules for notification services functions—they also document metadata about the ADF itself. This includes the structure of the events and subscriptions that the application accepts as input, and the structure of the notifications it produces. Examples of such metadata, described in detail below, include but are not limited to generator settings, distributor settings, vacuuming, version settings, notification history, application database information, application executing settings, and distributor information.

The notification services component 1320 (FIG. 13) includes a generator component (not shown) within the notification engine 1410 (FIG. 14) that matches events to subscriptions and ultimately produces notifications. Generator setting considerations may be defined in a <Generator> node in the ADF. One consideration that should be taken into account is how many threads the generator may use to process event batches. Such a factor can be considered a trade-off between improving application speed and monopolizing system resources. Part of such consideration is evaluating how much benefit can be gained by adding more threads. It is appreciated that some operations do not lend themselves to better efficiency through parallelism and may sometimes become less efficient. To indicate this information, a value can be specified for in a <ThreadPoolSize> element in the <Generator> node.

Functionally, the notification services generator attempts to execute event chronicle rules in parallel, followed by subscription rules (both event rules and scheduled rules). The generator will attempt to utilize threads available within the thread pool while executing rules.

Figure 16:
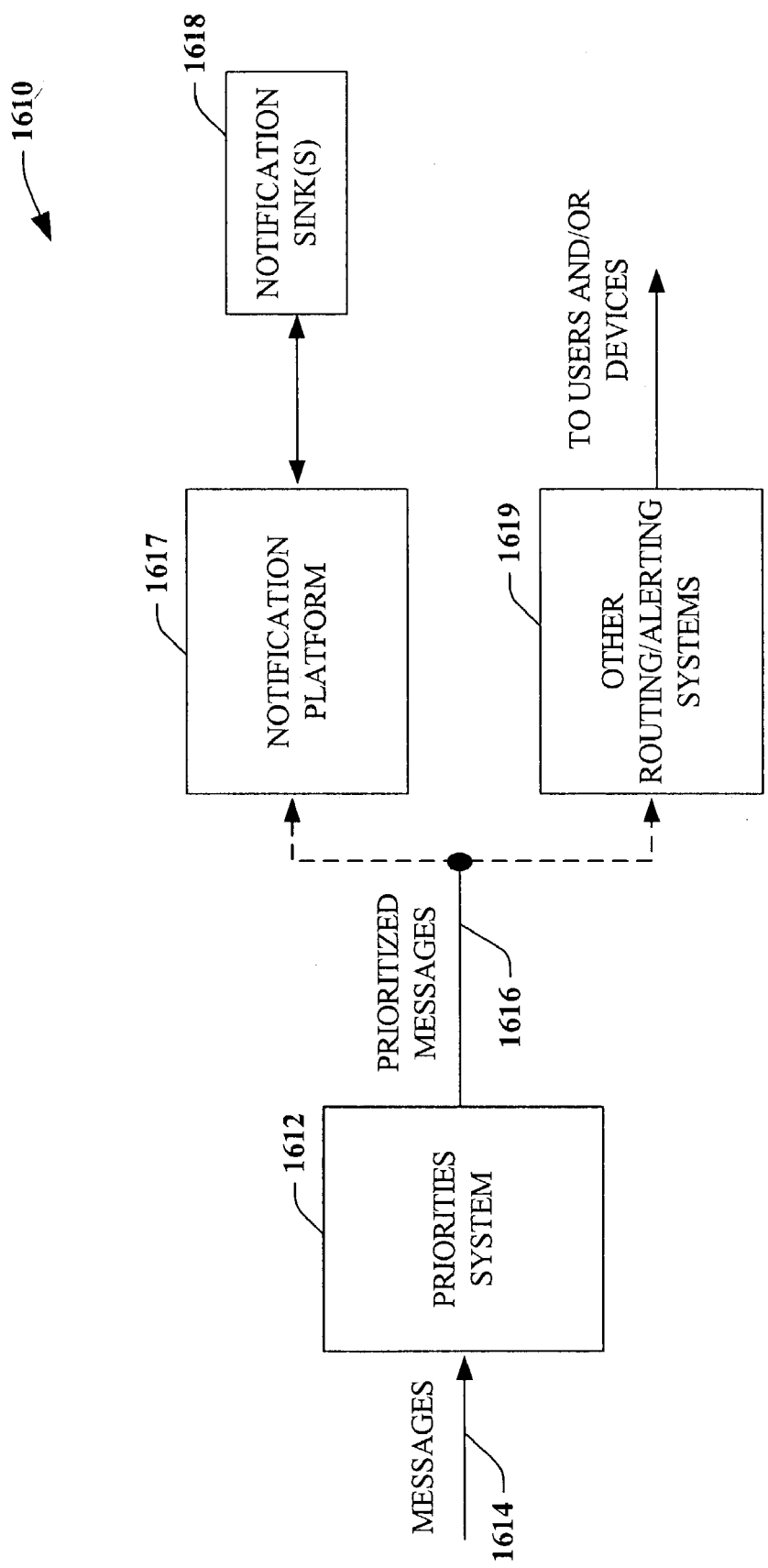
FIG. 16 is a schematic block diagram of a priorities system in accordance with an aspect of the present invention.

Referring to FIG. 16, a system 1610 illustrates a priorities system 1612 and notification architecture in accordance with an aspect of the present invention. The priorities system 1612 receives one or more messages or notifications 1614, generates a priority or measure of importance (e.g., probability value that the message is of a high or low importance) for the associated message, and provides the one or more messages with an associated priority value at an output 1616. As will be described in more detail below, classifiers can be constructed and trained to automatically assign measures of priorities to the messages 1614. For example, the output 1616 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 1617 can be employed in conjunction with the priorities system 1612 to direct prioritized messages to one or more notification sinks accessible to users. As will be described in more detail below, the notification platform 1617 can be adapted to receive the prioritized messages 1616 and make decisions regarding when, where, and how to notify the user, for example. As an example, the notification platform 1617 can determine a communications modality (e.g., current notification sink 1618 of the user such as a cell phone, or Personal Digital Assistant (PDA)) and likely location and/or likely focus of attention of the user. If a high importance e-mail were received, for example, the notification platform 1617 can determine the users location/focus and direct/reformat the message to the notification sink 1618 associated with the user. If a lower priority message 1616 were received, the notification platform 1617 can be configured to leave the e-mail in the user's in-box for later review as desired, for example. As will be described in more detail below, other routing and/or alerting systems 1619 may be utilized to direct prioritized messages 1616 to users and/or other systems.

Figure 17:
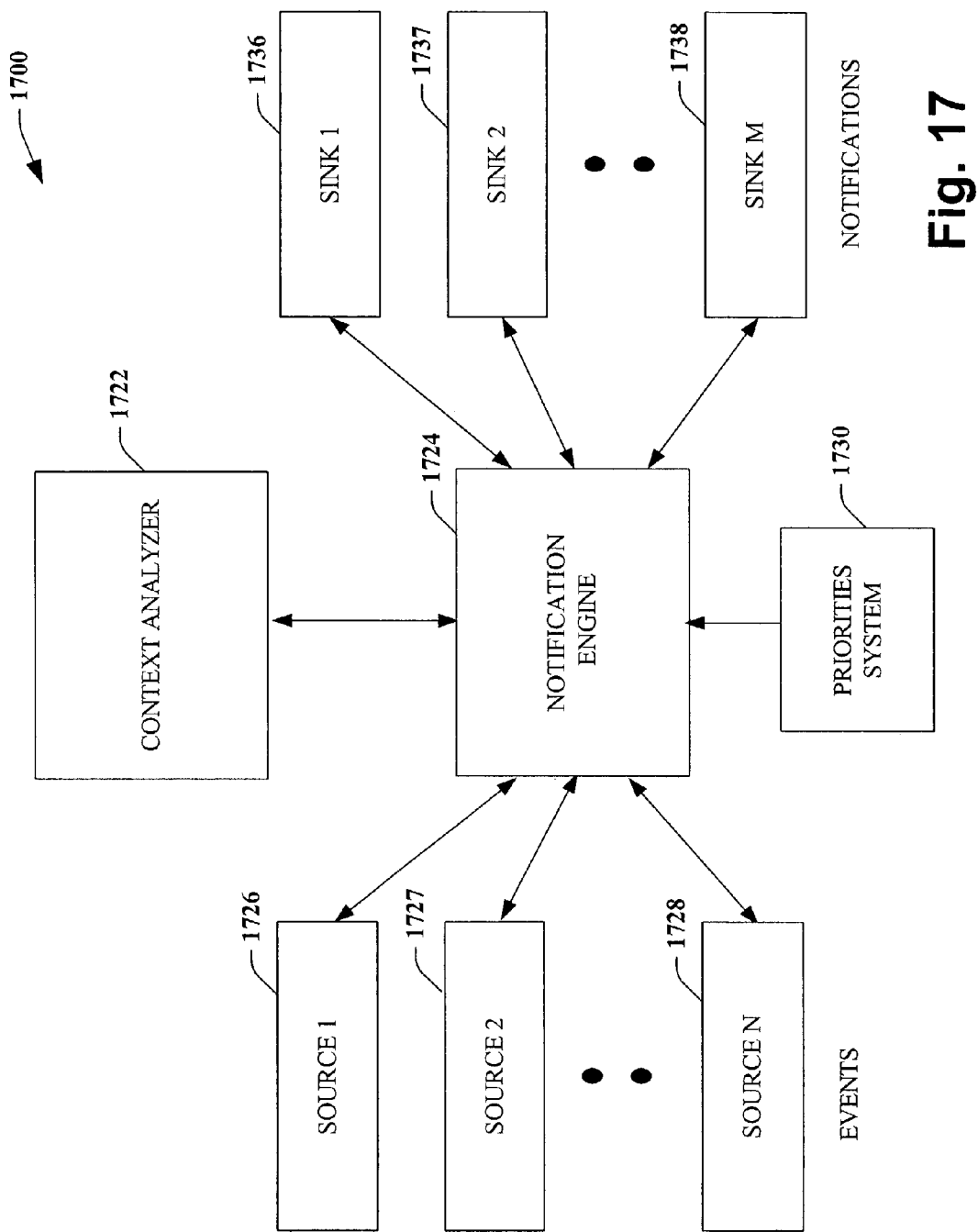
FIG. 17 is a schematic block diagram illustrating systematic cooperation between a notification engine and a context analyzer according to an aspect of the present invention.

Turning now to FIG. 17, a system 1700 illustrates how the notification engine and context analyzer function together according to an aspect of the present invention. The system 1700 includes a context analyzer 1722, a notification engine 1724, one or more notification sources 1 through N, 1726, 1727, 1728, a priorities system 1730, which can operate as a notification source, and one or more notification sinks, 1 through M, 1736, 1737, 1738, wherein N an M are integers, respectively. The sources are also referred to as event publishers, while the sinks are also referred to as event subscribers. There can be any number of sinks and sources. In general, the notification engine 1724 conveys notifications, which are also referred to as events or alerts, from the sources 1726–1728 to the sinks 1736–1738, based in part on parametric information stored in and/or accessed by the context analyzer 1722.

The context analyzer 1722 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification engine 1724, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 1722, according to one aspect of the present invention is inclusive of contextual information determined by the analyzer. The contextual information is determined by the analyzer 1722 by discerning the user's location and attentional status based on one or more contextual information sources (not shown), as is described in more detail in a later section of the description. The context analyzer 1722, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 1726–1728, 1730 generate notifications intended for the user and/or other entity. For example, the sources 1726–1728 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the priorities system 1730 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification sources 1726–1728 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

- e-mail desktop applications such as calendar systems;
- computer systems (e.g., that may alert the user with messages that information about alerts about system activity or problems);
- Internet-related services, appointment information, scheduling queries;
- changes in documents or numbers of certain kinds of documents in one or more shared folders;
- availability of new documents in response to standing or persistent queries for information; and/or,
- information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 1736–1738 are able to provide notifications to the user. For example, such notification sinks 1736–1738 can include computers, such as desktop and/or laptop computers, handheld computers, cell phones, landline phones, pagers, automotive-based computers, as well as other systems/applications as can be appreciated. It is noted that some of the sinks 1736–1738 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification engine 1724 accesses the information stored and/or determined by the context analyzer, and determines which of the notifications received from the sources 1726–1728 to convey to which of the sinks 1736–1738. Furthermore, the notification engine 1724 can determine how the notification is to be conveyed, depending on which of the sinks 1736–1738 has been selected to send the information to. For example, it may be determined that notifications should be summarized before being provided to a selected sinks 1736–1738.

The invention is not limited to how the engine 1724 makes its decisions as to which of the notifications to convey to which of the notification sinks, and in what manner the notifications are conveyed. In accordance with one aspect, a decision-theoretic analysis can be utilized. For example, the notification engine 1724 can be adapted to infer important uncertainties about variables including a user's location, attention, device availability, and amount of time until the user will access the information if there were no alert. The notification engine 1724 can then make notification decisions about whether to alert a user to a notification, and if so, the nature of the summarization and the suitable device or devices to employ for relaying the notification. In general, the notification engine 1724 determines the net expected value of a notification. In doing so, it can consider the following:

- the fidelity and transmission reliability of each available notification sink;
- the attentional cost of disturbing the user;
- the novelty of the information to the user;
- the time until the user will review the information on his or her own;
- the potentially context-sensitive value of the information; and/or,
- the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification engine 1724 can make decisions as to one or more of the following:

- what the user is currently attending to and doing (based on, for example, contextual information);
- where the user currently is;
- how important the information is;
- what is the cost of deferring the notification;
- how distracting would a notification be;
- what is the likelihood of getting through to the user; and,
- what is the fidelity loss associated with the use of a specific mode of a given notification sink.

Therefore, the notification engine 1724 can perform an analysis, such as a decision-theoretic analysis, of pending and active notifications, evaluates context-dependent variables provided by information sinks and sources, and infers selected uncertainties, such as the time until a user is likely to review information and the user's location and current attentional state.

Furthermore, the notification engine 1724 can access information stored in a user profile by the context analyzer 1722 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification engine 1724 determines how and whether to notify the user.

According to one aspect of the present invention, the notification platform architecture 1700 can be configured as a layer that resides over an eventing or messaging infrastructure. However, the invention is not limited to any particular eventing infrastructure. Such eventing and messaging systems and protocols can include:
- HyperText Transport Protocol (HTTP), or HTTP extensions as known within the art;
- Simple Object Access Protocol (SOAP), as known within the art;
- Windows Management Instrumentation (WMI), as known within the art;
- Jini, as known within the art; and,
- substantially any type of communications protocols, such as those based on packet-switching protocols, for example.

Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks receive notifications, alerts and events, for example. The present invention is not so limited, however.

Figure 18:
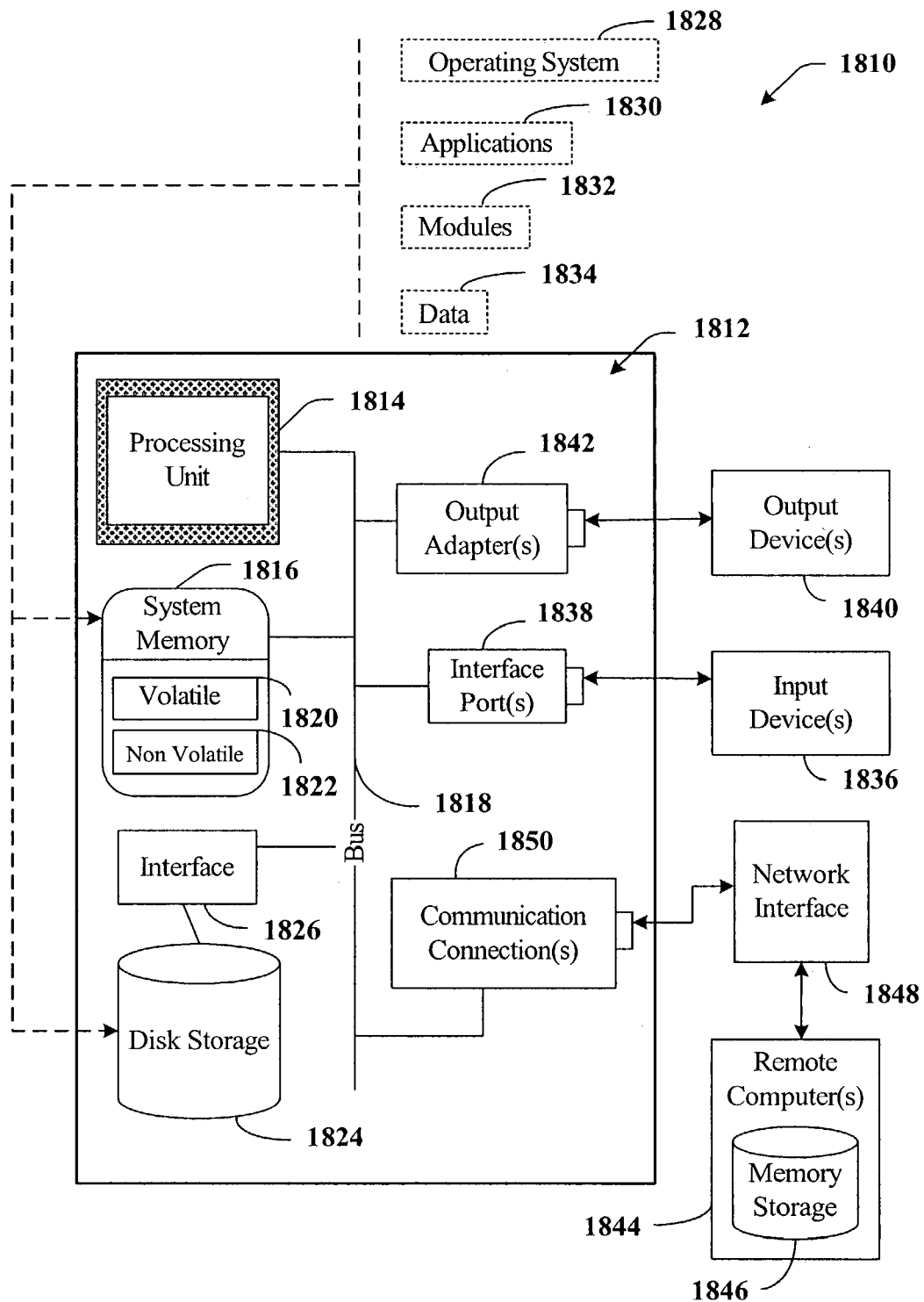
FIG. 18 is a schematic block diagram illustrating a suitable operating environment in accordance with an aspect of the present invention.

With reference to FIG. 18, an exemplary environment 1810 for implementing various aspects of the invention includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable ROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/non-removable, volatile/non-volatile computer storage media. FIG. 18 illustrates, for example a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on disk storage 1824, acts to control and allocate resources of the computer system 1812. System applications 1830 take advantage of the management of resources by operating system 1828 through program modules 1832 and program data 1834 stored either in system memory 1816 or on disk storage 1824. It is to be appreciated that the present invention can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapter 1842 is provided to illustrate that there are some output devices 1840 like monitors, speakers, and printers, among other output devices 1840, that require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

Figure 19:
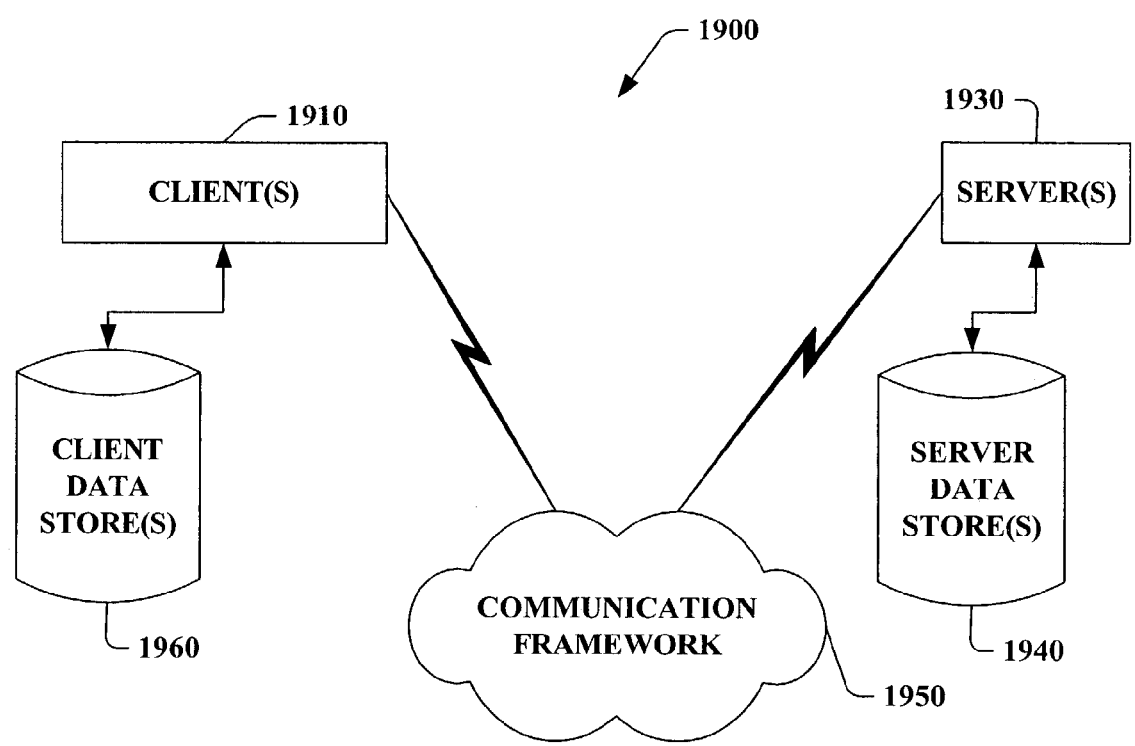
FIG. 19 is a schematic block diagram of a sample-computing environment with which the present invention can interact.

FIG. 19 is a schematic block diagram of a sample-computing environment 1900 with which the present invention can interact. The system 1900 includes one or more client(s) 1910. The client(s) 1910 can be hardware and/or software (e.g., threads, processes, computing devices). The system 1900 also includes one or more server(s) 4180. The server(s) 1930 can also be hardware and/or software (e.g., threads, processes, computing devices). The servers 1930 can house threads to perform transformations by employing the present invention, for example. One possible communication between a client 1910 and a server 1930 may be in the form of a data packet adapted to be transmitted between two or more computer processes. The system 1900 includes a communication framework 1950 that can be employed to facilitate communications between the client(s) 1910 and the server(s) 1930. The client(s) 1910 are operably connected to one or more client data store(s) 1960 that can be employed to store information local to the client(s) 1910. Similarly, the server(s) 1930 are operably connected to one or more server data store(s) 1940 that can be employed to store information local to the servers 1930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A notification system comprising a computer processor for executing the following software components, the system is recorded on a computer-readable medium and capable of execution by a computer, comprising:
   an agent component that processes received events and subscription information, the agent employing the events and subscriptions as data prior to processing so as to facilitate event and subscription processing;
   a rules processor component associated with the agent component to perform automated actions in accordance with the processed events, subscription information and one or more rules, the one or more rules capture a user's preference for performing the automated actions, the rules processor component comprises one or more rule templates that are configured via one or more rule parameters to perform the automated actions, the rule parameters include a subscriber id, a match action, and a match parameter, and wherein the one or more rules are modeled as parameterized queries that join the data, the rules processor performs an SQL join operation that matches conditions indicated by the data in accordance with preferences defined by the one or more rules; and
   a context analyzer component that analyzes information regarding variables and parameters of a user that influence notification decision-making, the parameters comprise contextual information and additional parameters conditioned on the contextual information, the contextual information is discerned based on contextual information sources, the contextual information sources comprise at least one of sensors and statistical models, and the additional parameters comprise at least one of functions of observations made autonomously via one or more sensors and dynamically inferred via automated inference, the context analyzer component determining when and if the notifications should be delivered.

2. The system of claim 1, the agent component employs at least one of user state information, application state information, and user context information to facilitate performance of the automated actions.

3. The system of claim 1, the one or more rules are executed according to at least one of consecutive processing and concurrent processing.

4. The system of claim 1, the rules processor component employs external data to route notifications or perform automated actions, the external data associated with an attribute related to a user of a notification.

5. The system of claim 4, the attribute is maintained in a separate table from the notification.

6. The system of claim 1, the one or more rules executed in accordance with at least one of a select operation, a match operation, a queue action, a from operation, and a where operation.

7. The system of claim 1, further comprising an Application Definition File (ADF) to facilitate configuration of the agent component.

8. The system of claim 1, the agent component is distributed across one or more applications and accesses one or more databases to perform automated actions.

9. The system of claim 1, the automated actions are performed between nodes in a communications chain.

10. The system of claim 1, the agent component is associated with at least one of an e-mail application, a voice application, an image application, a video application, a calendar application, a messenger application, a business application, a mobile application, an alerting application, a database application, an action component, and a desktop application.

11. The system of claim 1, the agent component maintains state information between at least two messages.

12. The system of claim 1, the agent component is associated with a filtering application to mitigate receiving unwanted messages.

13. The system of claim 12, the filtering application is a SPAM filter.

14. The system of claim 1, further comprising a context component that updates at least one of a local and a remote database with information relating to at least one user's current state.

15. The system of claim 14, the context component includes at least one of a context source, a context characterization, a context consumer, information to obtain context, context propagation information, and information to expose context.

16. The system of claim 1, further comprising a priorities component to determine a notification ordering for one or more received notifications, the priorities component assigns an urgency value to the notifications.

17. The system of claim 1, the rules processor component processes ad-hoc combinations of Boolean expressions.

18. A notification system comprising a computer processor for executing the following software components, the system is recorded on a computer-readable medium and capable of execution by a computer, comprising:
   means for obtaining events and subscription information;
   means for processing the events and subscriptions information according to one or more rules;
   means for generating data from the events and subscriptions data;
   means for performing automated actions for subscribers in accordance with a joining of the one or more rules, the one or more rules associated with at least one rules template having at least one rules parameter, wherein the one or more rules are modeled as parameterized queries that join the data;
   means for performing an SOL join operation that matches conditions indicated by the data in accordance with preferences defined by the one or more rules; and
   means for analyzing information regarding variables and parameters of a user that influence notification decision-making, the parameters comprise contextual information and additional parameters conditioned on the contextual information, the contextual information is discerned based on contextual information sources, the contextual information sources comprise at least one of sensors and statistical models, and the additional parameters comprise at least one of functions of observations made autonomously via one or more sensors and dynamically inferred via automated inference.

19. The system of claim 18, the data comprising a plurality of data fields.

20. The system of claim 19, the data fields being stored in a notification table that is propagated with notification specific information.

21. The system of claim 18, further comprising computer implemented means for configuring the rules template and the rules parameter.

22. A computer implemented notification methodology, comprising the following computer executable acts:
   modeling subscription and event information as data;
   storing the subscription and event data in respective tables, the tables being propagated with the subscription and event information;
   upon an event occurring, processing the subscription and event data to perform automated actions in accordance with a database join operation of one or more rules, wherein the one or more rules are modeled as parameterized queries that join the data, and wherein the database join operation matches conditions indicated by the data in accordance with preferences defined by the one or more rules;
   employing at least one of a rules template and a rules parameter to process the one or more rules; and
   analyzing information regarding variables and parameters of a user that influence notification decision-making, the parameters comprise contextual information and additional parameters conditioned on the contextual information, the contextual information is discerned based on contextual information sources, the contextual information sources comprise at least one of sensors and statistical models, and the additional parameters comprise at least one of functions of observations made autonomously via one or more sensors and dynamically inferred via automated inference.

23. The method of claim 22, further comprising modeling context information and application state information as data, and employing at least one of the context information and the application state information in the database join operation.

24. The method of claim 22, further comprising processing a plurality of events in a concurrent manner.

25. The method of claim 22, the rules processed according to at least one of an external data source, a state that is maintained between at least two messages, a set-oriented process, and a real time communications process to facilitate routing of the notifications.

26. The method of claim 22, further comprising applying the rules in a filtering process to mitigate reception of unwanted notifications.

27. The method of claim 22, further comprising analyzing at least one of a context source, a context consumer, a context character, a context obtaining function, a context propagation function, and a context exposing function when processing the rules.

* * * * *